US012784331B2

(12) United States Patent
Sasagawa

(10) Patent No.: US 12,784,331 B2
(45) Date of Patent: Nov. 3, 2026

(54) IMAGE PROCESSING METHOD, NEURAL NETWORK TRAINING METHOD, THREE-DIMENSIONAL IMAGE DISPLAY METHOD, IMAGE PROCESSING SYSTEM, NEURAL NETWORK TRAINING SYSTEM, AND THREE-DIMENSIONAL IMAGE DISPLAY SYSTEM

(71) Applicant: Socionext Inc., Kanagawa (JP)

(72) Inventor: Yukihiro Sasagawa, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 122 days.

(21) Appl. No.: 18/903,684

(22) Filed: Oct. 1, 2024

(65) Prior Publication Data

US 2025/0029321 A1 Jan. 23, 2025

Related U.S. Application Data

(63) Continuation of application No. PCT/JP2022/017069, filed on Apr. 4, 2022.

(51) Int. Cl.
*G06T 15/00* (2011.01)
*G06T 15/20* (2011.01)
(Continued)

(52) U.S. Cl.
CPC .......... *G06T 15/205* (2013.01); *G06V 10/771* (2022.01); *G06V 10/82* (2022.01); *H04N 13/282* (2018.05)

(58) Field of Classification Search
CPC ....... G06T 19/00; G06T 19/20; G06T 15/005; G06T 17/20; G06T 17/00; G06T 15/10;
(Continued)

(56) References Cited

U.S. PATENT DOCUMENTS 12,444,126 B1 * 10/2025 Tremblay .............. G06T 15/506
2018/0232851 A1 * 8/2018 Scholl ..................... G06T 3/047
(Continued)

FOREIGN PATENT DOCUMENTS

WO 2017/122294 A1 7/2017
WO 2019/053922 A1 3/2019

OTHER PUBLICATIONS

International Search Report dated Jun. 28, 2022 issued in International Patent Application No. PCT/JP2022/017069, with English translation.

(Continued)

*Primary Examiner* — Gordon G Liu
(74) *Attorney, Agent, or Firm* — Rimon P.C.

(57) ABSTRACT

A computer-implemented image processing method of synthesizing a free viewpoint image on a display projection surface from plurality of captured images, the method including: acquiring the plurality of captured images with a plurality of respective cameras; estimating projection surface residual data by machine learning using the plurality of captured images and viewpoint data as inputs, the projection surface residual data representing a difference between a bowl-shaped predefined projection surface and the display projection surface; and acquiring the free viewpoint image by mapping the plurality of captured images onto the display projection surface using information about the predefined projection surface, the projection surface residual data, and the viewpoint data.

12 Claims, 21 Drawing Sheets

(51) Int. Cl.
*G06V 10/771* (2022.01)
*G06V 10/82* (2022.01)
*H04N 13/282* (2018.01)

(58) Field of Classification Search
CPC ......... G06T 15/00; G06T 13/40; G06T 15/06; G06T 15/08; G06T 15/20; G06T 2219/2016; G06T 15/04; G06T 2210/41; G06T 1/20; G06T 19/006; G06T 7/337; G06T 7/50; G06T 7/74; G06T 2200/04; G06T 2207/10016; G06T 2207/30244; G06T 2219/024; G06T 2210/12; G06T 2210/21; G06T 7/70; G06T 2207/20084; G06T 1/60; G06T 13/20; G06T 7/20; G06T 2219/0004; G06T 2207/30004; G06T 7/12; G06T 2207/10088; G06T 17/05; H04N 23/57; H04N 23/90; H04N 23/64; H04N 23/611; H04N 23/635; H04N 7/147; H04N 7/157; H04N 13/344; H04N 13/383; H04N 13/128; H04N 13/282; G06F 16/51; G06F 21/602; G06F 3/013; G06F 3/012; G06F 3/011; G06F 3/017; G06F 3/167; G06V 20/20; G06V 10/25; G06V 2201/07; B33Y 50/00; H04R 25/70; H04R 2225/77; G07T 2207/10081
USPC .......................................................... 345/419
See application file for complete search history.

(56) References Cited

U.S. PATENT DOCUMENTS

| | | | | |
|---|---|---|---|---|
| 2018/0309962 | A1 | 10/2018 | Shimizu | |
| 2019/0026956 | A1 * | 1/2019 | Gausebeck | G06T 7/593 |
| 2020/0134777 | A1 | 4/2020 | Yamamoto | |
| 2022/0309602 | A1 * | 9/2022 | Okabe | G06T 7/0008 |

OTHER PUBLICATIONS

Seiya Shimizu, et.al, “Wraparound View System for Motor Vihicles”, Fujitsu S cientific & Technical Journal 46(1): pp. 95-102, 2010.
“Fujitsu Develops World’s First 3D Image Synthesis Technology to Display Vehicle Exterior without Distortion” https://www.fujitsu.com/global/about/resources/news/press-releases/2013/1009-03.htmlhttps://pr.fujitsu.com/jp/news/2013/10/9-2.html.
Ronghang Hu, et.al, “Worldsheet: Wrapp ing the World in a 3D Sheet for View Synthesis from a Single Image”, ICCV2021, pp. 1-17.
Oto Takeuchi et al. “A Study on Generation of Omnidirectional Free Viewpoint Images Using a Generative Adversarial Network”. IEICE Technical Report, vol. 118, No. 502, MVE2018-67, pp. 79-84 (Mar. 2019).with Partial English Translation of Section 3. Cited in ISR for No. PCT/JP2022/017069.

* cited by examiner

IMAGE PROCESSING METHOD, NEURAL NETWORK TRAINING METHOD, THREE-DIMENSIONAL IMAGE DISPLAY METHOD, IMAGE PROCESSING SYSTEM, NEURAL NETWORK TRAINING SYSTEM, AND THREE-DIMENSIONAL IMAGE DISPLAY SYSTEM

CROSS-REFERENCE TO RELATED APPLICATION

This application is a continuation application of International Application No. PCT/JP2022/017069, filed on Apr. 4, 2022, and designated the U.S., the entire contents of which are incorporated herein by reference.

BACKGROUND OF THE INVENTION

1. Field of the Invention

The present disclosure relates to an image processing method, a neural network training method, a three-dimensional image display method, an image processing system, a neural network training system, and a three-dimensional image display system.

2. Description of the Related Art

An image processing system that can synthesize a three-dimensional image in which the point of view can be moved freely (hereinafter referred to as a "a free viewpoint image") by using images captured by multiple cameras, has been known heretofore.

For example, there is a technique in which a projection surface shaped like a bowl (or a mortar) is provided in advance, and in which images captured by multiple cameras are mapped onto the projection surface to synthesize a free viewpoint image. Also, there is a technique in which a projection surface is calculated by using distance data measured by a three-dimensional sensing device such as a LiDAR (Laser Imaging Detection and Ranging), and in which images captured by multiple cameras are mapped onto a projection surface to synthesize a free viewpoint image has been known heretofore.

SUMMARY OF THE INVENTION

One embodiment of the present disclosure provides a computer-implemented image processing method of synthesizing a free viewpoint image on a display projection surface from plurality of captured images, the method including: acquiring the plurality of captured images with a plurality of respective cameras; estimating projection surface residual data by machine learning using the plurality of captured images and viewpoint data as inputs, the projection surface residual data representing a difference between a bowl-shaped predefined projection surface and the display projection surface; and acquiring the free viewpoint image by mapping the plurality of captured images onto the display projection surface using information about the predefined projection surface, the projection surface residual data, and the viewpoint data.

DETAILED DESCRIPTION OF THE PREFERRED EMBODIMENTS

There is a problem with the first technique described above: the projection surface that is provided in advance may not match the actual three-dimensional structure, and this mismatch may produce distortion in synthesized images projected on the projection surface.

There is also a problem with the second technique described above: adding a three-dimensional sensing device such as a LiDAR makes it possible to reduce the distortion of synthesized images, but adding a three-dimensional sensing device results in an increase in cost.

One embodiment of the present disclosure has been made in view of the foregoing, and aims to synthesize free viewpoint images with little distortion, without relying on a three-dimensional sensing device, in an image processing system in which free viewpoint images are synthesized using multiple images.

That is, according to one embodiment of the present disclosure, it is possible to synthesize free viewpoint images with little distortion, without relying on a three-dimensional sensing device, in an image processing system in which free viewpoint images are synthesized using multiple images.

Now, embodiments of the present disclosure will be described in detail with reference to the accompanying drawings.

According to the present embodiment, an image processing system synthesizes and displays three-dimensional images in which the point of view can be moved freely (therefore "free viewpoint image") by using images captured by multiple cameras. The image processing system according to the present embodiment can be applied to, for example, techniques for monitoring the surroundings of mobile entities such as automobiles, robots, or drones, or to AR (Augmented Reality)/VR (Virtual Reality) technologies. Here, an example case in which the image processing system according to the present embodiment is installed in a vehicle such as an automobile will be described. Furthermore, in the following description, the words "learn(ing)" and "train (ing)" may be used interchangeably.

<System Structure>

Figure 1:
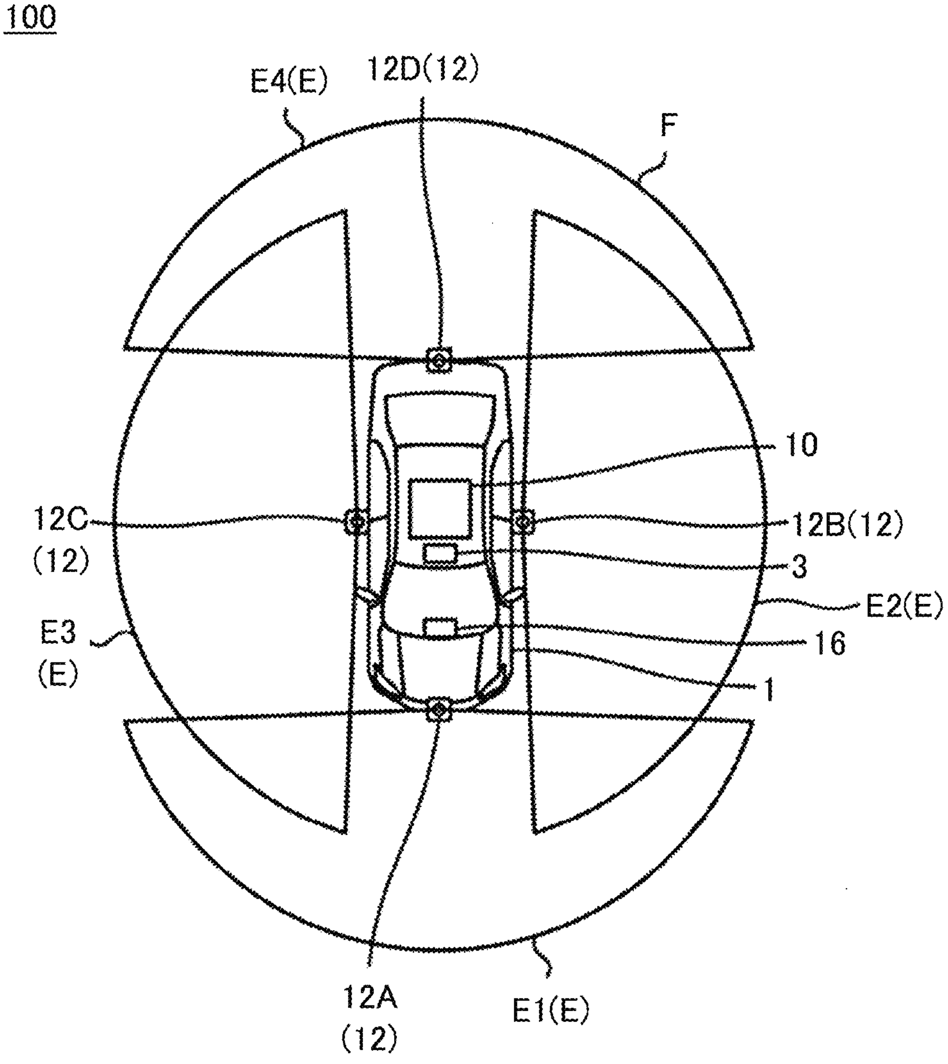
FIG. 1 is a diagram that shows an example system structure of an image processing system according to one embodiment of the present disclosure.

FIG. 1 is a diagram that shows an example system structure of an image processing system according to one embodiment of the present disclosure. In the example illustrated in FIG. 1, an image processing system 100 includes, for example, an image processing device 10, multiple cameras 12, a display device 16, and so forth that are mounted in a vehicle 1, which is an automobile or the like. The above components are connected to each other so that they can communicate with each other via, for example, an in-vehicle network, a wired cable, or wireless communication.

Note that the vehicle 1 is an example of a mobile entity in which the image processing system 100 according to the present embodiment is mounted. The mobile entity is by no means limited to the vehicle 1 and, for example, a robot that moves on legs, a manned or unmanned aircraft, or any other device or machine that has a moving function may be used as the vehicle 1.

A camera 12 is an image capturing device that captures and acquires images of the surroundings of the vehicle 1. In the example of FIG. 1, the vehicle 1 is provided with four cameras 12A to 12D all facing different photographing ranges E1 to E4. Note that, in the following description, the term "camera(s) 12" will be used to refer to one or more non-specific cameras among the four cameras 12A to 12D. Also, the term "photographing range(s) E" will be used to refer to one or more non-specific photographing ranges among the four photographing ranges E1 to E4. The number of cameras 12 and photographing ranges E shown in FIG. 1 is an example and not limiting, and has only to be two or more.

In the example of FIG. 1, the camera 12A is provided facing the photographing range E1 in front of the vehicle 1, and the camera 12B is provided facing the photographing range E2 on one side of the vehicle 1. Also, the camera 12C is provided facing the photographing range E3 on the other side of the vehicle 1, and the camera 12D is provided facing the photographing range E4 on the rear of the vehicle 1.

The display device 16 is, for example, a display device such as an LCD (Liquid Crystal Display) an organic EL (Electro-Luminescence), etc., or any other device with a display function to display various information.

The image processing device 10 is a computer that executes image processing for synthesizing free viewpoint images from multiple images captured by the cameras 12A to 12D, on a display projection surface, by running a predetermined program. A free viewpoint image is a three-dimensional images that, using images captured by multiple cameras, can be displayed such that the point of view can be moved freely.

(Overview of Processing)

Figure 2:
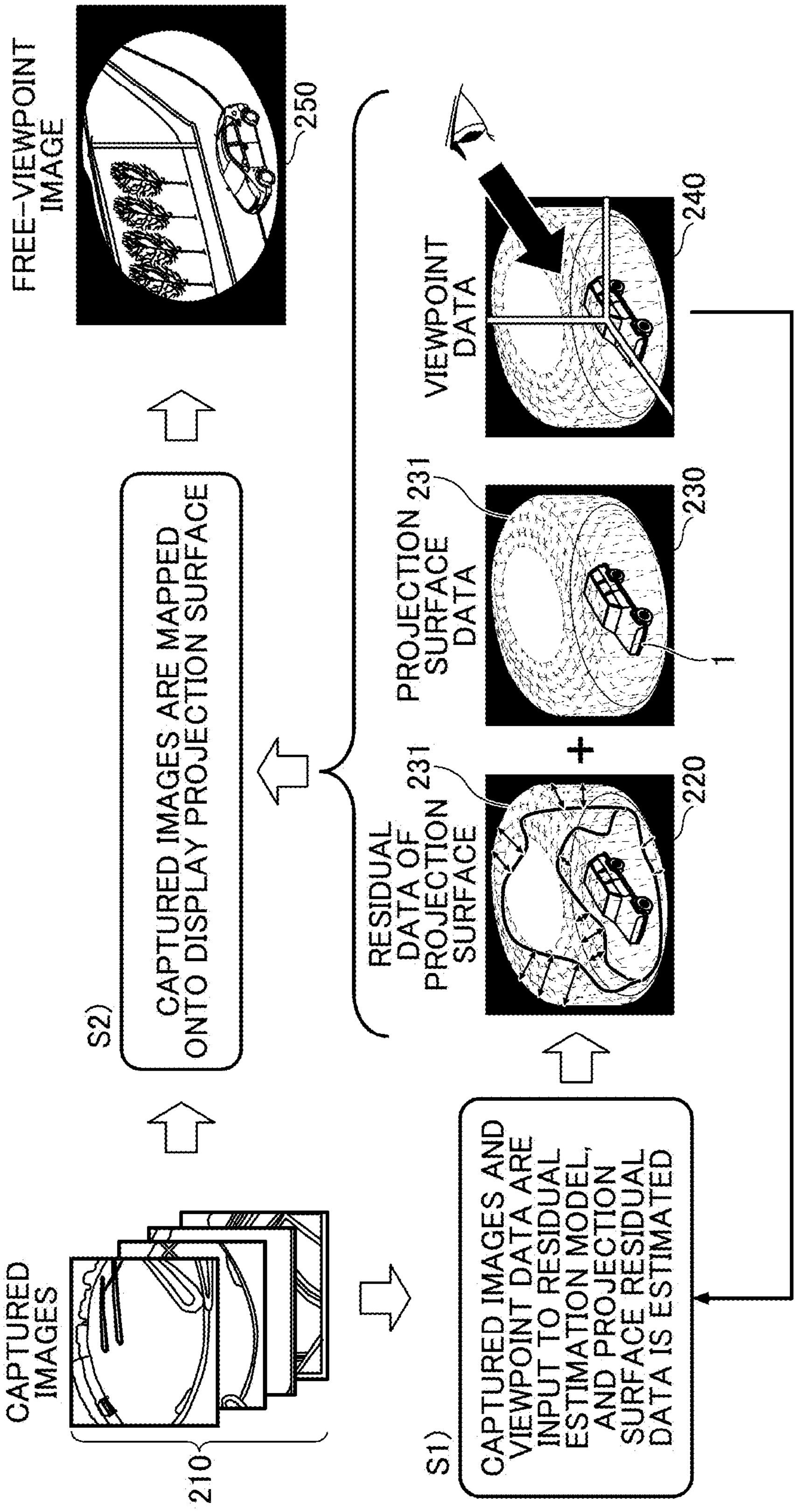
FIG. 2 is a diagram for explaining an overview of image processing according to one embodiment of the present disclosure.

FIG. 2 is a diagram for explaining an overview of image processing according to one embodiment of the present disclosure. The image processing device 10 has projection surface data 230, which is information of a projection surface (hereinafter referred to as "predefined projection surface 231") that is shaped like a bowl (or a mortar) and defined in advance around the vehicle 1.

Also, the image processing device 10 inputs multiple images 210 captured around the vehicle 1 by the cameras 12 and viewpoint data 240 indicating the viewpoint of a free viewpoint image, into a residual estimation model, and estimates residual data 220 on the projection surface by machine learning (step S1). Here, the residual estimation model is a trained neural network, which, using the images 210 and viewpoint data 240 as input data, outputs the projection surface residual data 220, which shows the difference between the predefined projection surface 231 and the projection surface on which free viewpoint images are projected (hereinafter referred to as "display projection surface").

Furthermore, using projection surface data 230, which is information about the predefined projection surface 231, the residual data 220, and the viewpoint data 240, the image processing device 10 generates a free viewpoint image 250, in which the multiple images 210 are mapped onto the display projection surface (step S2). Here, as mentioned earlier, the residual data 220 is information that represents the difference between the display projection surface and the predefined projection surface 231, so that the image processing device 10 can calculate the display projection surface from the projection surface data 230 and the residual data 220.

Note that the residual estimation model is trained in advance, by machine learning, to estimate the difference between the predefined projection surface 231 and the display projection surface from multiple captured images for learning, the viewpoint data 240, and three-dimensional data of one or more three-dimensional objects imaged in the multiple captured images for learning.

Consequently, according to the present embodiment, in the image processing system 100 in which a free viewpoint image 250 is synthesized using multiple images 210, it is possible to synthesize free viewpoint images with little distortion, without relying upon a three-dimensional sensing device.

Note that the system structure of the image processing system 100 illustrated in FIG. 1 is one example. For example, the image processing system 100 may be a wearable device such as AR goggles or VR goggles having multiple cameras 12 and a display device 16 and worn by a user.

<Hardware Structure>

Figure 3:
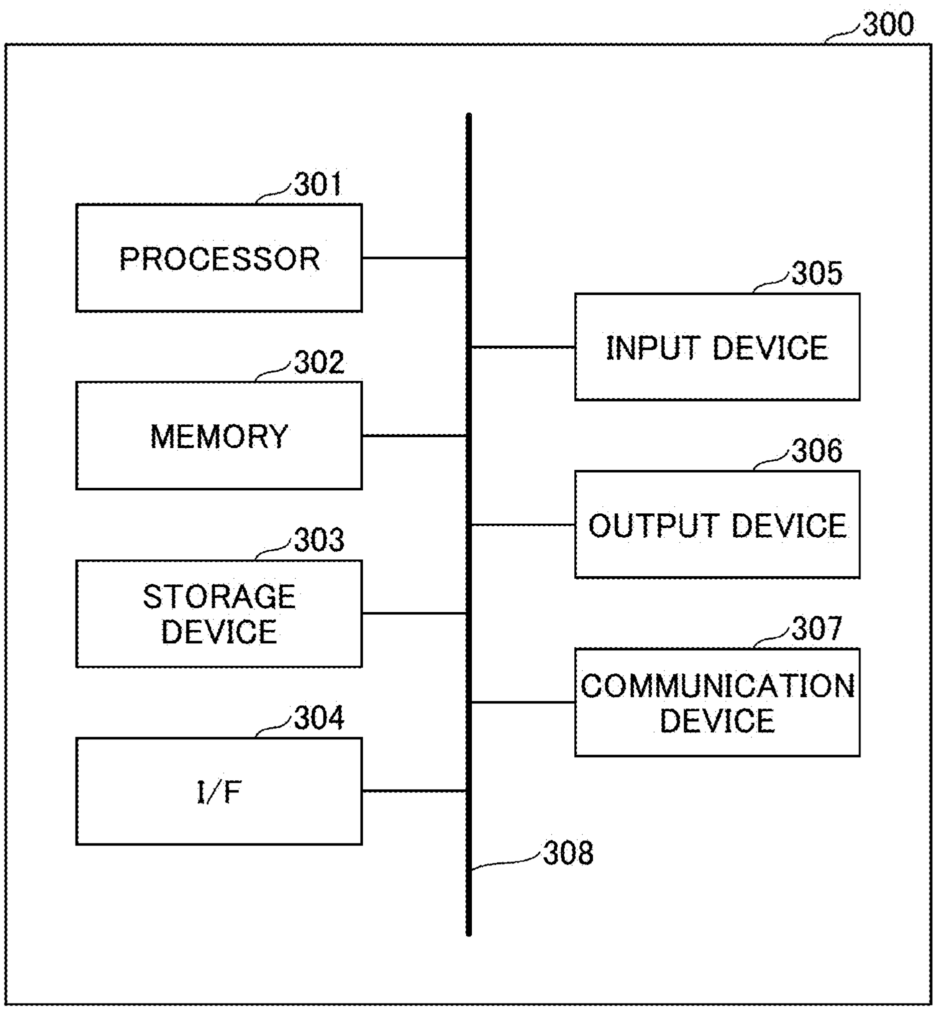
FIG. 3 is a diagram that shows an example hardware structure of a computer according to one embodiment of the present disclosure.

The image processing device 10 has, for example, a hardware structure of a computer 300, as shown in FIG. 3.

FIG. 3 is a diagram that shows an example hardware structure of a computer according to one embodiment. The computer 300 includes, for example, a processor 301, a memory 302, a storage device 303, an I/F (Interface) 304, an input device 305, an output device 306, a communication device 307, a bus 308, and so forth.

The processor 301 is, for example, a calculation device such as a CPU (Central Processing Unit) or a GPU (Graphics Processing Unit) that carries out a predetermined process by running a program stored in a storage medium such as the storage device 303. The memory 302 includes, for example, RAM (Random Access Memory), which is a volatile memory used as a work area for the processor 301, a ROM (Read Only Memory), which is a non-volatile memory that stores, for example, a programs for starting the processor 301, and so forth. The storage device 303 is a non-volatile storage device of large capacity, such as an SSD (Solid State Drive), HDD (Hard Disk Drive), etc. The I/F 304 includes, for example, a variety of interfaces for connecting external devices such as cameras 12, display device 16, etc., to the computer 300.

The input device 305 includes various devices for receiving inputs from outside (for example, a keyboard, a touch panel, a pointing device, a microphone, a switch, a button, a sensor, etc.). The output device 206 includes various devices for sending outputs to outside (for example, a display, a speaker, an indicator, etc.). The communication device 307 includes various communication devices for communicating with other devices via a wired or wireless network. The bus 308 is connected to each of the above components, so that, for example, address signals, data signals, and various control signals can be transmitted between the components.

<Functional Structure>

Figure 4:
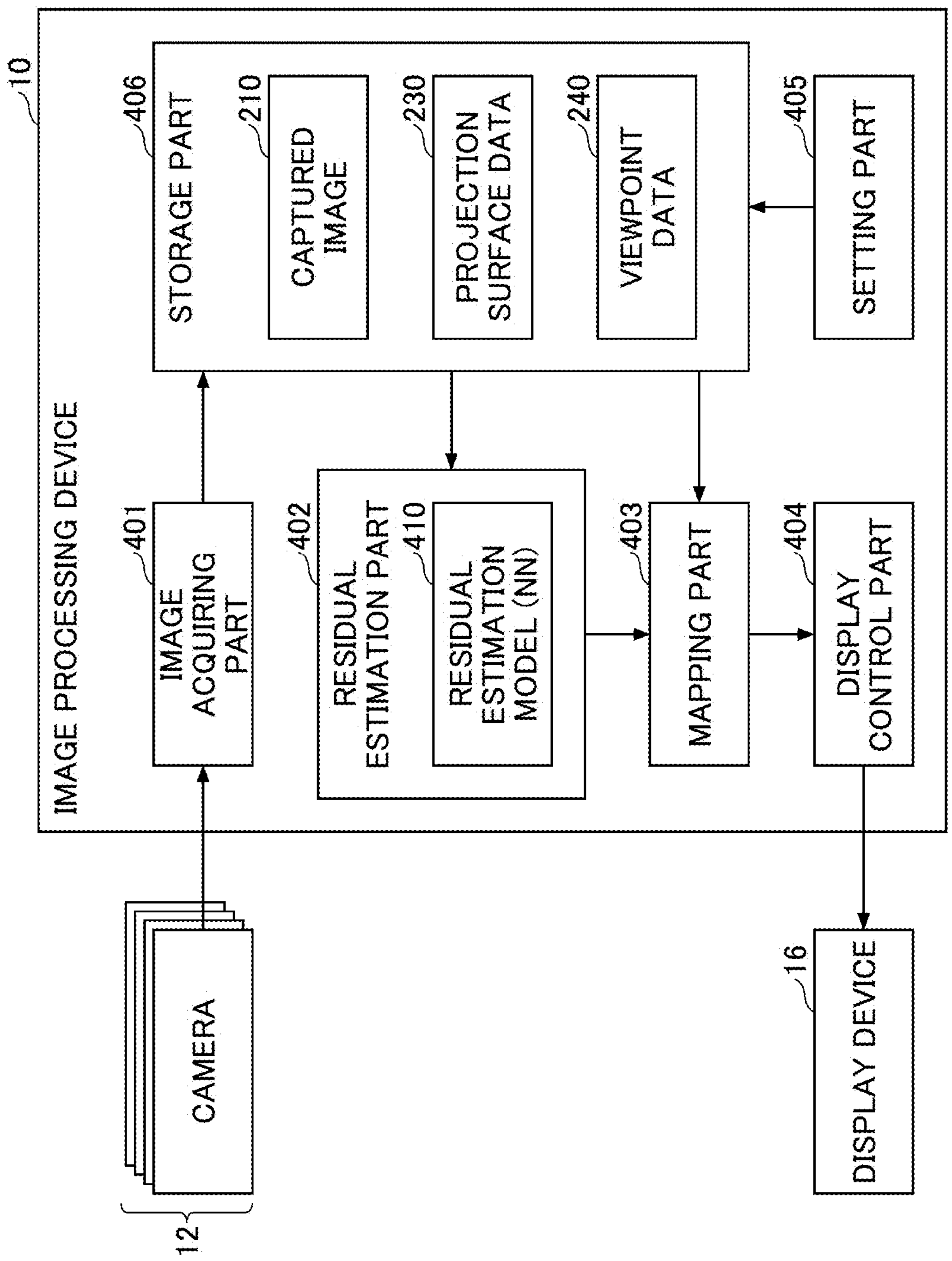
FIG. 4 is a diagram that shows an example functional structure of an image processing device according to one embodiment of the present disclosure.

FIG. 4 is a diagram that shows an example functional structure of an image processing device according to one embodiment. The image processing device 10 implements an image acquiring part 401, a residual estimation part 402, a mapping part 403, a display control part 404, a setting part 405, a storage part 406, and so forth, by running an image processing program on the processor 301 in FIG. 3, for example. Note that at least some of the above functional parts may be implemented by hardware.

The image acquiring part 401 carries out an image acquiring process of acquiring multiple images 210 from each of the multiple cameras 12. For example, the image acquiring part 401 acquires multiple images 210 that capture images of the surroundings of the vehicle 1, from the cameras 12A, 12B, 12C, and 12D.

The residual estimation part 402 receives the multiple images 210 acquired by the image acquiring part 401 and viewpoint data 240 as inputs, and carries out a residual estimation process of estimating projection surface residual data 220, which shows the difference between the predefined projection surface 231 that is defined in advance and shaped like a bowl, and the display projection surface, by machine learning.

Preferably, the residual estimation part 402 has a residual estimation model 410 that is trained to infer the difference between the predefined projection surface 231 and the display projection surface from multiple captured images for learning, viewpoint data 240, and three-dimensional data of one or more three-dimensional objects imaged in the multiple captured images for learning. The residual estimation model 4 is a trained neural network (hereinafter referred to as "NN") that, using multiple images 210 and viewpoint data 240 as input data, outputs projection surface residual data 220 that represents the difference between the predefined projection surface 231 and the display projection surface on which free viewpoint images are projected. According to the present embodiment, among the NNs that receive multiple images 210 and viewpoint data 240 as input data and output residual data 220, a trained NN is referred to as "residual estimation model 410."

The residual estimation part 402 inputs the multiple images 210 and viewpoint data 240, acquired by the image acquiring part 401, to the residual estimation model 410, and acquires the residual data 220 output from the residual estimation model 410. The viewpoint data 240 here is coordinate data that represents the viewpoint in free viewpoint images generated by the image processing device 10, and represented, for example, by Cartesian coordinates, polar coordinates, and so forth. Also, the three-dimensional data above refers to, for example, three-dimensional point-cloud data measured by a three-dimensional sensing device such as a LiDAR (Laser Imaging Detection and Ranging), or data including three-dimensional distance data of objects around the vehicle 1 such as a depth image or the like including depth data.

The mapping part 403 carries out a mapping process of mapping the images 210 that have been acquired, onto the display projection surface, by using the projection surface data 230 related to the predefined projection surface 231 and the residual data 220 estimated by the residual estimation part 402, and acquires the free viewpoint image 250. As mentioned above, the residual data 220 is information that represents the difference between the display projection surface and the predefined projection surface 231, so that the mapping part 403 can calculate the display projection surface from the projection surface data 230, which is information about the predefined projection surface 231, and the residual data 220. Also, the process of mapping multiple images onto a calculated display projection surface to acquire the free viewpoint image 250 can use existing techniques.

The display control part 404 carries out a display control process of displaying, for example, the free viewpoint image 250 generated by the mapping part 403 on the display device 16 or the like.

The setting part 405 carries out a setting process of setting data such as the projection surface data 230, viewpoint data 240 and so forth, in the image processing device 10.

The storage part 406 is implemented by, for example, a program that runs on the processor 301, the storage device 303, and the memory 302, and carries out a storage process of storing various information (or data) including the captured image 210, the projection surface data 230, and the viewpoint data 240.

Note that the functional structure of the image processing device 10 shown in FIG. 4 is an example. For example, each functional part included in the image processing device 10 may be provided in multiple computers 300 in a distributed manner.

<Process Flow>

Next, the process flow of the image processing method according to the present embodiment will be described.

(Image Processing)

Figure 5:
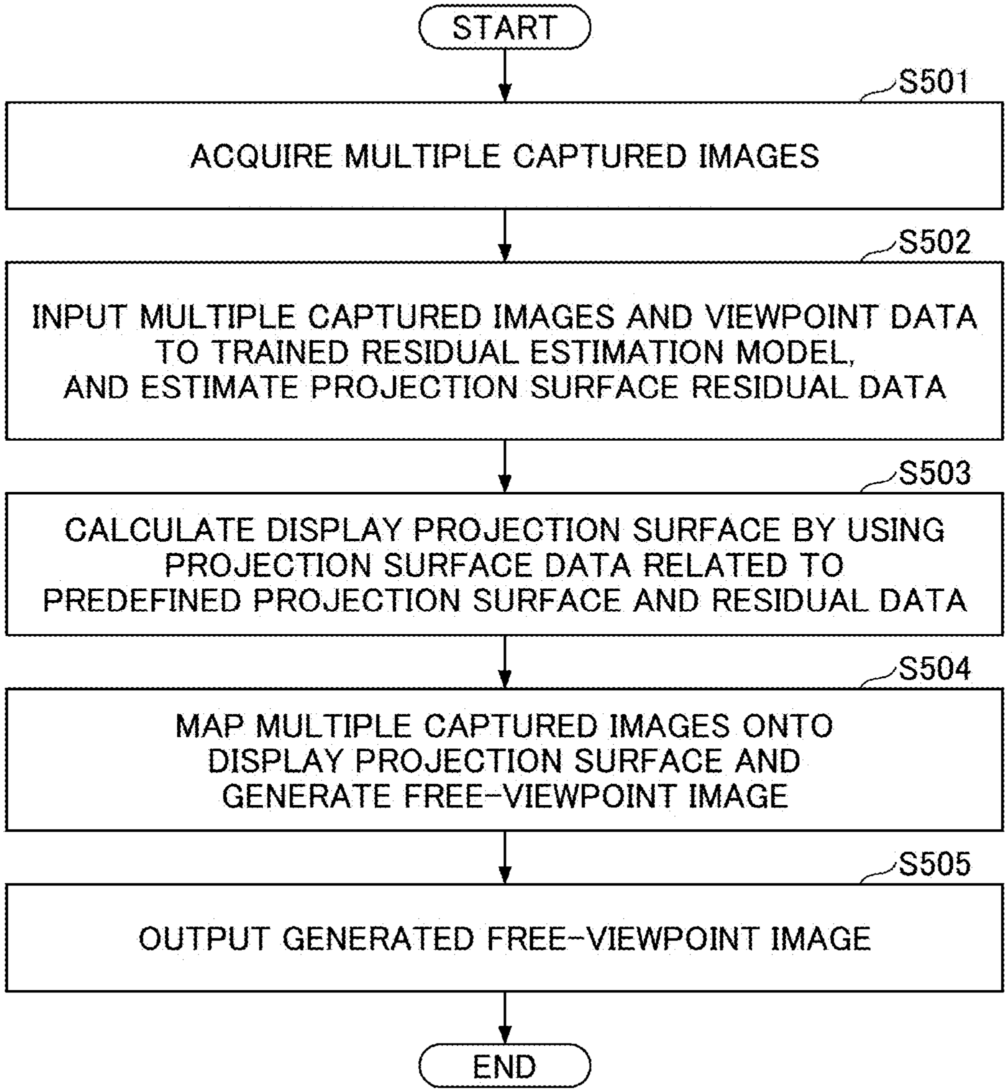
FIG. 5 is a flowchart that shows an example of image processing according to one embodiment of the present disclosure.

FIG. 5 is a flowchart that shows an example of image processing according to one embodiment of the present disclosure. This process illustrates a specific example of the image processing described above with reference to FIG. 2, which is executed by the image processing device 10 described above with reference to FIG. 4.

In step S501, the image acquiring part 401 acquires multiple images 210, in which images of the surroundings of the vehicle 1 are captured by multiple cameras 12, for example.

In step S502, the residual estimation part 402 inputs multiple images 210, which are acquired by the image acquiring part 401, and viewpoint data 240, which represents the point of view in the free viewpoint image 250, to the residual estimation model 410, and estimates the projection surface residual data 220.

In step S503, the mapping part 403 calculates a display projection surface whereupon the images 210 are projected, based on the projection surface data 230, which is information about the predefined projection surface 231 described earlier with reference to FIG. 2, and the residual data 220 estimated by the residual estimation part 402. For example, the mapping part 403 calculates the display projection surface by mirroring the residual data 220 on the predefined projection surface 231.

In step S504, the mapping part 403 maps the images 210 acquired by the image acquiring part 401 onto the display projection surface and generates the free viewpoint image 250.

In step S505, the display control part 404 displays the free viewpoint image 250 generated in the mapping part 403 on the display device 16 or the like.

By means of the process of FIG. 5, the image processing device 10 can synthesize the free viewpoint image 250 with little distortion, without relying on a three-dimensional sensing device, in the image processing system 100 in which the free viewpoint image 250 is synthesized using multiple images 210.

<About Learning Process>

Next, the process of training the residual estimation model 410 by machine learning will be described.

First Embodiment (Overview of Process)

Figure 6:
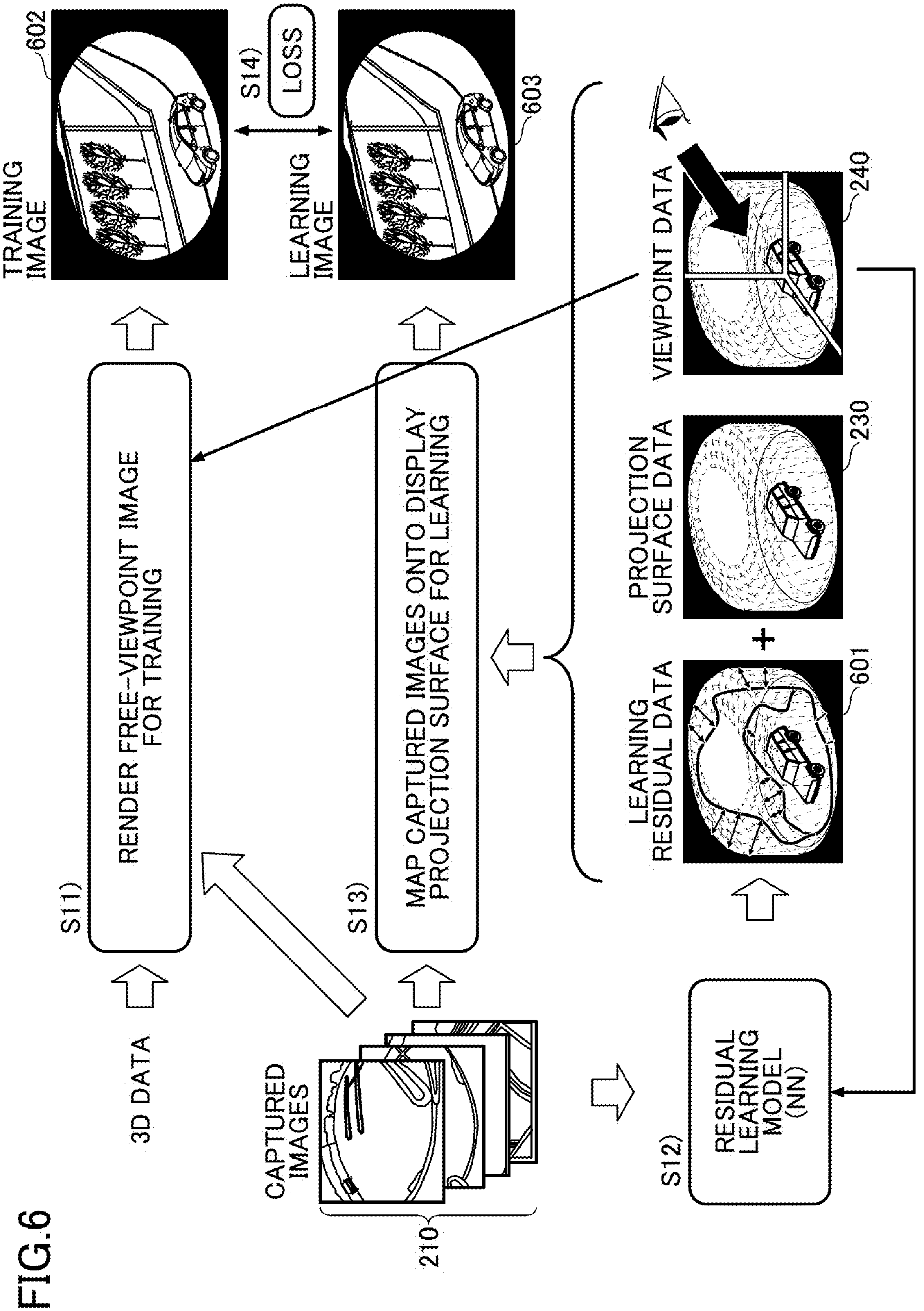
FIG. 6 is a diagram for explaining an overview of learning according to a first embodiment of the present disclosure.

FIG. 6 is a diagram for explaining an overview of learning according to a first embodiment of the present disclosure. This process illustrates an example of training, by machine learning, a residual learning model, which is an NN in which the image processing device 10 receives multiple images 210 and viewpoint data 240 as input data and outputs residual data 220. Note that, according to the present embodiment, among the NNs that receive multiple images 210 and viewpoint data 240 as input data and output residual data 220, an NN that is yet to be trained and/or an NN that is being trained are referred to as a "residual learning model." Also, the image processing device 10 that executes the learning process may be the same computer as the computer 300 that executes the image processing described earlier with reference to FIG. 2 to FIG. 4, or may be a different computer.

The image processing device 10 acquires the images 210 acquired by the multiple cameras 12, and the three-dimensional data (for example, three-dimensional point-cloud data, depth image, etc.) acquired by a three-dimensional sensor such as a LiDAR. Also, the image processing device 10 restores a three-dimensional image of the images 210 based on the three-dimensional data acquired, and, based on the viewpoint data 240, generates a training image 602 (rendering), which serves as a training free viewpoint image (step S11).

Also, the image processing device 10 inputs the multiple images 210 and viewpoint data 240 to the residual learning model, and acquires the residual data (hereinafter referred to as "learning residual data 601") output from the residual learning model (step S12). Following this, the image processing device 10, using the acquired learning residual data, the projection surface data 230, and the viewpoint data 240, maps the images 210 onto the display projection surface, thereby generating a learning free viewpoint image (hereinafter referred to as "learning image 603") (step S13).

Furthermore, the image processing device 10 trains the residual learning model (NN) such that the difference between the training image 602 that is generated and the learning image 603 becomes smaller (step S14).

<Functional Structure>

Figure 7:
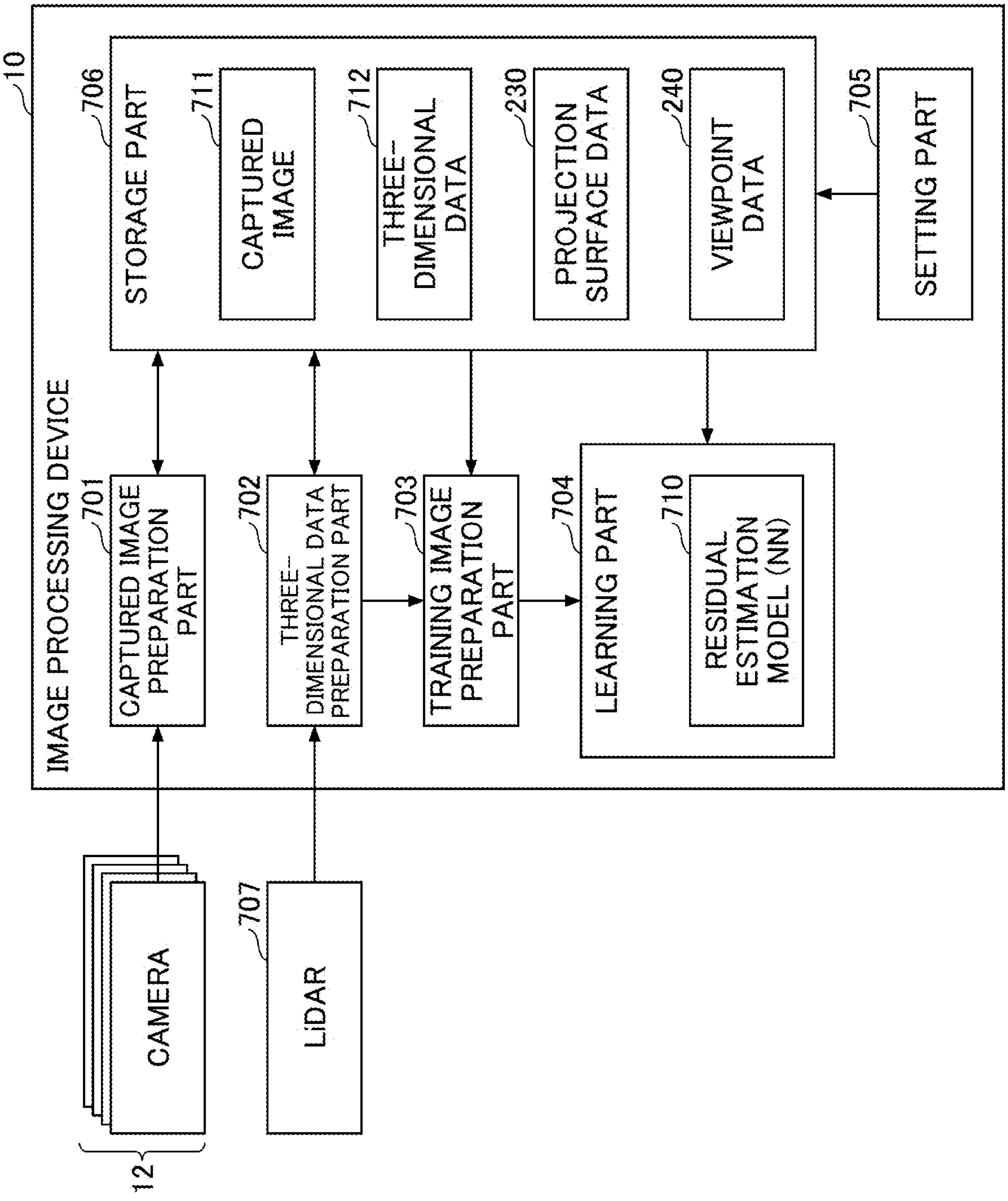
FIG. 7 is a diagram that shows an example functional structure of an image processing device (during learning) according to the first embodiment of the present disclosure.

FIG. 7 is a diagram that shows an example functional structure of the image processing device according to the first embodiment (during learning). The image processing device 10 implements a captured image preparation part 701, a three-dimensional data preparation part 702, a training image preparation part 703, a learning part 704, a setting part 705, a storage part 706, and so forth, by running a program for the learning process on the processor 301 of FIG. 3, for example. Note that at least some of the above functional parts may be implemented by hardware.

The captured image preparation part 701 carries out a captured image preparation process of preparing multiple learning images 210 captured by each of the multiple cameras 12. Note that the captured image preparation part 701 may acquire multiple images 210 on a real-time basis by using the cameras 12, or may acquire multiple images 210 that are needed in the learning process from the captured images 711 captured in advance and stored in the storage part 706 or the like.

The three-dimensional data preparation part 702 carries out a three-dimensional data preparation process of acquiring three-dimensional data (for example, three-dimensional point-cloud data, depth image, etc.) corresponding to the multiple learning images 210 that the captured image preparation part 701 prepares. For example, the three-dimensional data preparation part 702 acquires three-dimensional point-cloud data around the vehicle 1 at the same time as (in sync with) the multiple images 210 are captured, by using a three-dimensional sensor such as a LiDAR 707. Note that the three-dimensional data preparation part 702 may acquire three-dimensional data using other three-dimensional sensors, such as, for example, a stereo camera, a depth camera that captures depth images, or a wireless sensing device.

In another example, the three-dimensional data preparation part 702 may acquire three-dimensional data that indicates the positions of nearby three-dimensional objects, from the multiple learning images 210 stored in the storage part 706, by using a technique such as visual SLAM (Simultaneous Localization and Mapping). That is, the three-dimensional data preparation part 702 has only to prepare three-dimensional data that represents the positions of three-dimensional objects around the vehicle 1 that is in sync with the multiple learning images 210 prepared by the captured image preparation part 701, and the method of preparation may be any method.

The training image preparation part 703 performs a training image preparation process of restoring a three-dimensional image of the multiple images 210 based on the three-dimensional data prepared by the three-dimensional data preparation part 702, and generating a training image 602, which serves as a training free viewpoint image, based on the viewpoint data 240 (rendering).

The learning part 704 performs a learning process of training the residual learning model (NN) 710 using the multiple images 210, the viewpoint data 240, the projection surface data 230, and the training image 602. For example, the learning part 704 inputs the multiple images 210 and the viewpoint data 240 into the residual learning model (NN) 710 to acquire the learning residual data 601, and calculates the display projection surface for learning using the learning residual data 601 and the projection surface data 230. Also, using the viewpoint data 240, the learning part 704 maps the multiple images 210 onto the calculated display projection surface, and generates the learning image 603, which is a free viewpoint image for learning. Furthermore, the learning part 704 trains the residual learning model (NN) 710 such that the error between the training image 602 that is generated and the learning image 603 is reduced.

The setting part 705 carries out a setting process of setting up various information such as, for example, projection surface data 230, viewpoint data 240, etc., in the image processing device 10.

The storage part 706 is implemented by, for example, a program that runs on the processor 301, the storage device 303, the memory 302, and so forth. The storage part 706 stores various information such as captured images 711, three-dimensional data 712, projection surface data 230, viewpoint data 240, and other data (or information).

Note that the functional structure of the image processing device 10 shown in FIG. 7 is an example. For example, each functional part included in the image processing device 10 may be provided in multiple computers 300 in a distributed manner.

<Process Flow>

Next, the process flow of the neural network training method according to the first embodiment will be described.

Figure 8:
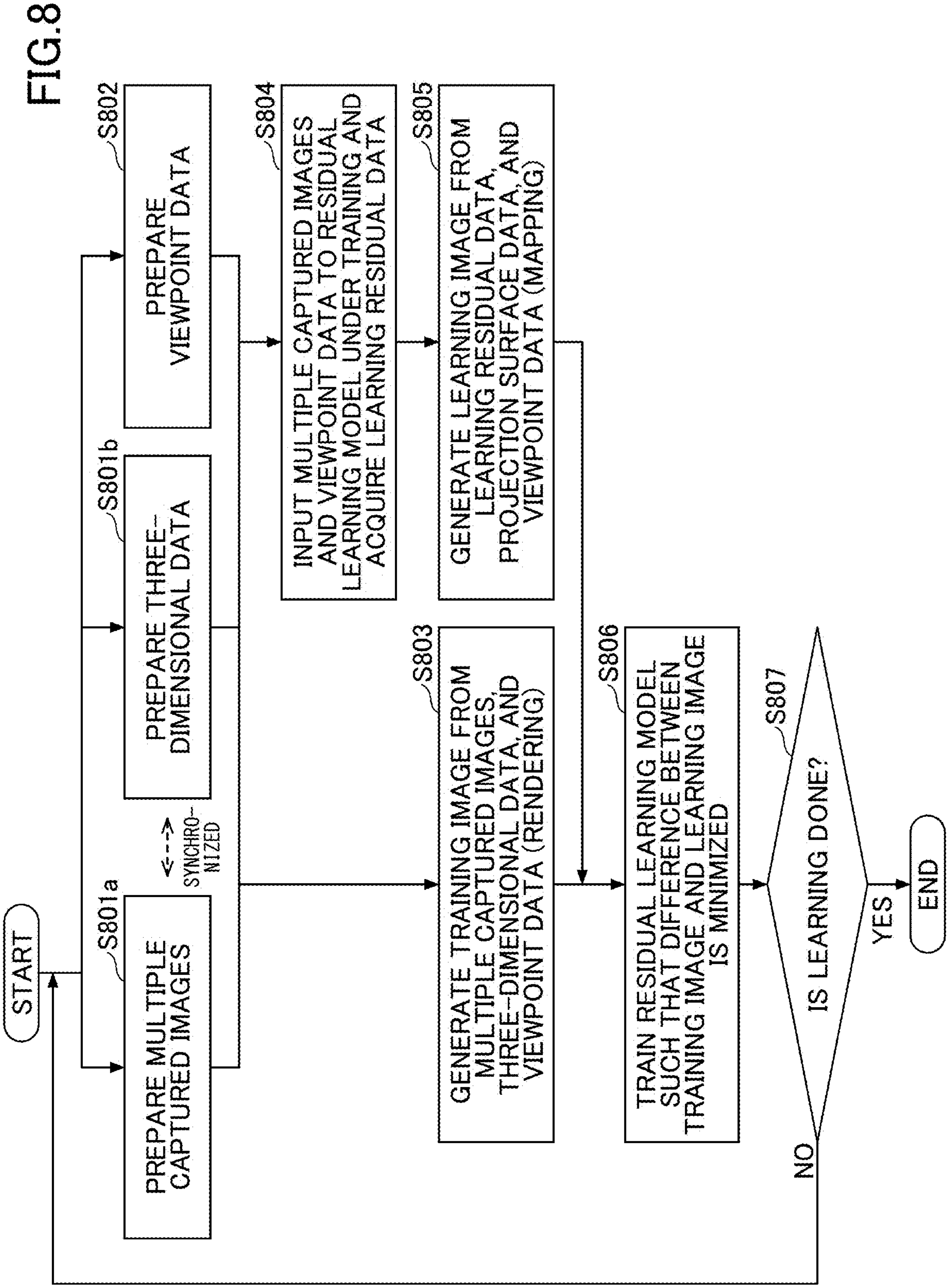
FIG. 8 is a flowchart that shows an example of learning according to the first embodiment of the present disclosure.

FIG. 8 is a flowchart illustrating an example learning process according to the present embodiment. This process illustrates a specific example of the learning process described above with reference to FIG. 26, which is executed by the image processing device 10 described above with reference to FIG. 7.

In step S801*a*, the captured image preparation part 701 prepares multiple learning images 210 captured by each of the multiple cameras 12. For example, using the multiple cameras 12, the captured image preparation part 701 acquires multiple images 210 that capture images of the surroundings of the vehicle 1.

In step S801*b*, the three-dimensional data preparation part 702 acquires three-dimensional data that corresponds to the learning images 210 prepared by the captured image preparation part 701. For example, the three-dimensional data preparation part 702 acquires three-dimensional data (for example, three-dimensional point-cloud data) of the surroundings of the vehicle 1 of the same time, in sync with the captured image preparation part 701.

In step S802, the image processing device 10 prepares viewpoint data 240, which represents the viewpoint to be learned. For example, the setting part 705 sets the coordinates of the viewpoint to be learned, in the residual learning model 710, as the viewpoint data 240.

In step S803, the training image preparation part 703, based on the three-dimensional data prepared by the three-dimensional data preparation part 702 recreates a three-dimensional image of the multiple images 210, and generates a training image 602 of the viewpoint data 240 (rendering).

In step S804, the learning part 704 inputs the images 210 and the viewpoint data 240 into the residual learning model (NN) 710, in parallel with the process of step S803, and acquires the learning residual data 601.

In step S805, the learning part 704 calculates the display projection surface from the learning residual data 601 and the projection surface data 230, and, based on the viewpoint data 240, maps the images 210 onto the display projection surface and generates the learning image 603.

In step S806, the learning part 704 trains the residual learning model 710 such that difference between the training image 602 that is generated and the learning image 603 is minimized. For example, the learning part 704 determines the weight of the residual learning model 710 at which the difference between the two images (for example, the total of differences per pixel value) is minimized, and sets the determined weight in the residual learning model 710.

In step S807, the learning part 704 determines whether or not training is done. For example, the learning part 704 may determine that training is done when the process from step S801 to step S806 is performed a predetermined number of times. Alternatively, the learning part 704 may determine that training is done when the difference between the training image 602 and the learning image 603 is less than or equal to a predetermined value.

In the event training is not done, the learning part 704 brings the process back to step S801*a* and S801*b*. On the other hand, in the event training is done, the learning part 704 ends the process of FIG. 8.

The image processing device 10 that has been described above with reference to FIG. 4 can execute the image processing described with reference to FIG. 5 by using the NN (residual learning model 710) trained through the process of FIG. 8 as the residual estimation model 410.

Second Embodiment (Overview of Process)

Figure 9:
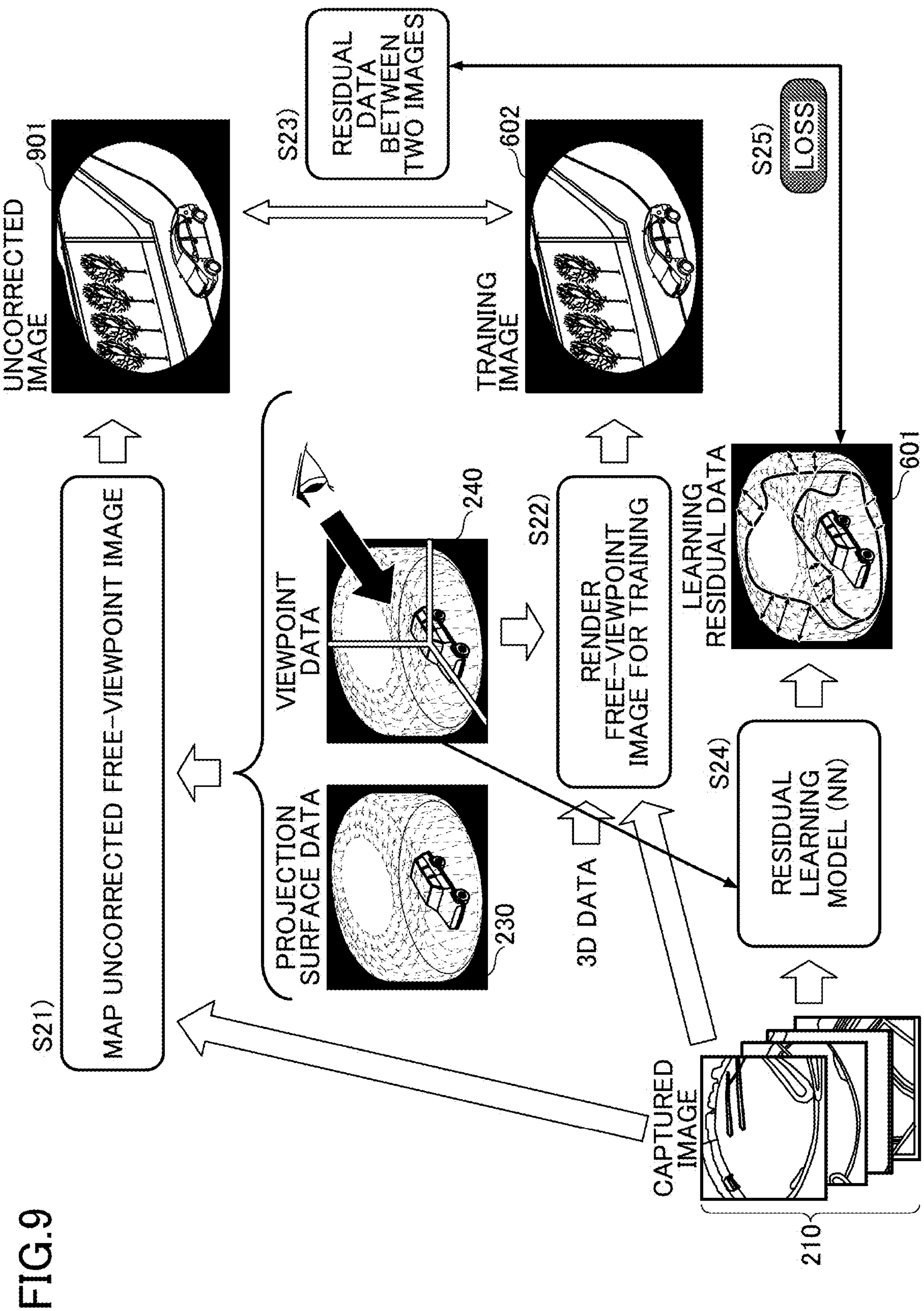
FIG. 9 is a diagram for explaining an overview of learning according to a second embodiment of the present disclosure.

FIG. 9 is a diagram for explaining an overview of the learning process according to the second embodiment. This process illustrates another example of training by machine learning of a residual learning model, which is an NN in which the image processing device 10 receives multiple images 210 and viewpoint data 240 as input data and outputs residual data 220. Note that the processing details that are the same as in the first embodiment will not be repeated here.

Using the multiple images 210, projection surface data 230, and viewpoint data 240, the image processing device 10 generates an uncorrected free viewpoint image (hereinafter referred to as "uncorrected image 901") in which the images 210 are mapped onto the predefined projection surface 231 (step S21).

Also, the image processing device 10 acquires the three-dimensional data and recreates the acquired images 210 based on the three-dimensional data acquired. Furthermore, based on the viewpoint data 240, the image processing device 10 generates training image 602, which serves as a training free viewpoint image (rendering) (step S22).

Also, the image processing device 10 compares the uncorrected image 901 generated thus and the training image 602, and determines the residual data between the two images (step S23). Furthermore, the image processing device 10 inputs multiple images 210 and viewpoint data 240 into the residual learning model 710 and acquires the learning residual data 601 (step S24). Following this, the image processing device 10 trains the residual learning model 710 such that the difference between the residual data between the two images and the learning residual data 601 is minimized (step S25).

<Functional Structure>

Figure 10:
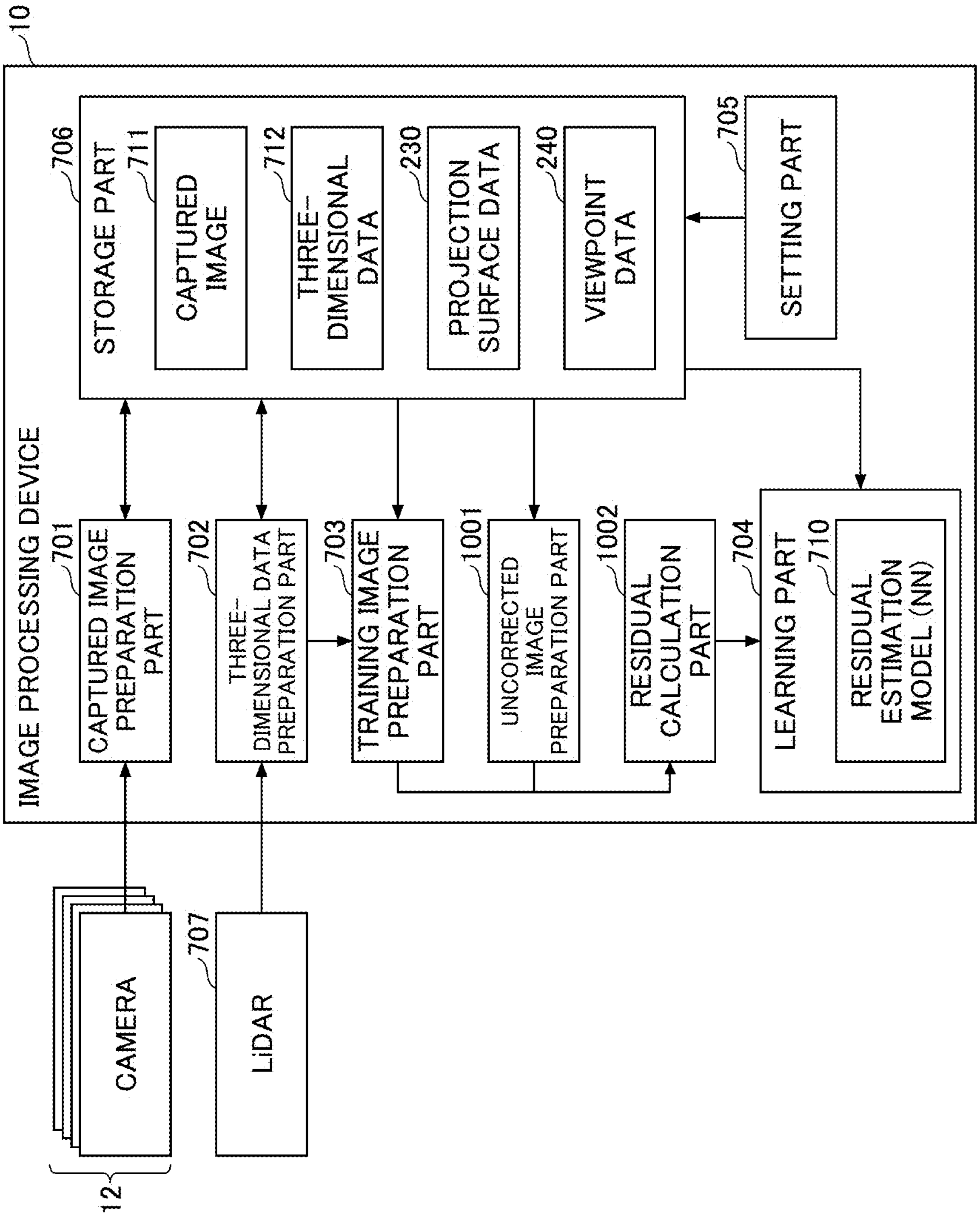
FIG. 10 is a diagram that shows an example functional structure of an image processing device (during learning) according to the second embodiment of the present disclosure.

FIG. 10 is a diagram that shows an example functional structure of the image processing device (during learning) according to the second embodiment of the present invention. As shown in FIG. 10, the image processing device 10 according to the second embodiment, in addition to having the functional structure of the image processing device 10 according to the first embodiment having been described above with reference to FIG. 7, has an uncorrected image preparation part 1001 and a residual calculation part 1002. Also, as has been mentioned earlier with reference to FIG. 9, the learning part 704 performs a learning process that is different from that of the first embodiment.

The uncorrected image preparation part 1001 is implemented by, for example, a program that runs on the processor 301. Using multiple images 210, projection surface data 230, and viewpoint data 240, the uncorrected image preparation part 1001 performs an uncorrected image preparation process of generating an uncorrected image 901 in which the images 210 are mapped onto the predefined projection surface 231.

The residual calculation part 1002 is implemented by, for example, a program that runs on the processor 301, and the residual calculation part 1002 performs a residual calculation process of comparing the uncorrected image 901 generated thus and the training image 602 and calculating residual data between the two images.

The learning part 704 according to the second embodiment performs a learning process of training the residual learning model 710 such that the difference between the residual data between the two images calculated by the residual calculation part 1002 and the learning residual data 601 output from the residual learning model 710 is minimized.

Note that the functional parts other than those described above are the same as those of the image processing device 10 according to the first embodiment described above with reference to FIG. 7 and therefore will not be described here.

<Process Flow>

Next, the process flow in the neural network training method according to the second embodiment will be described below.

Figure 11:
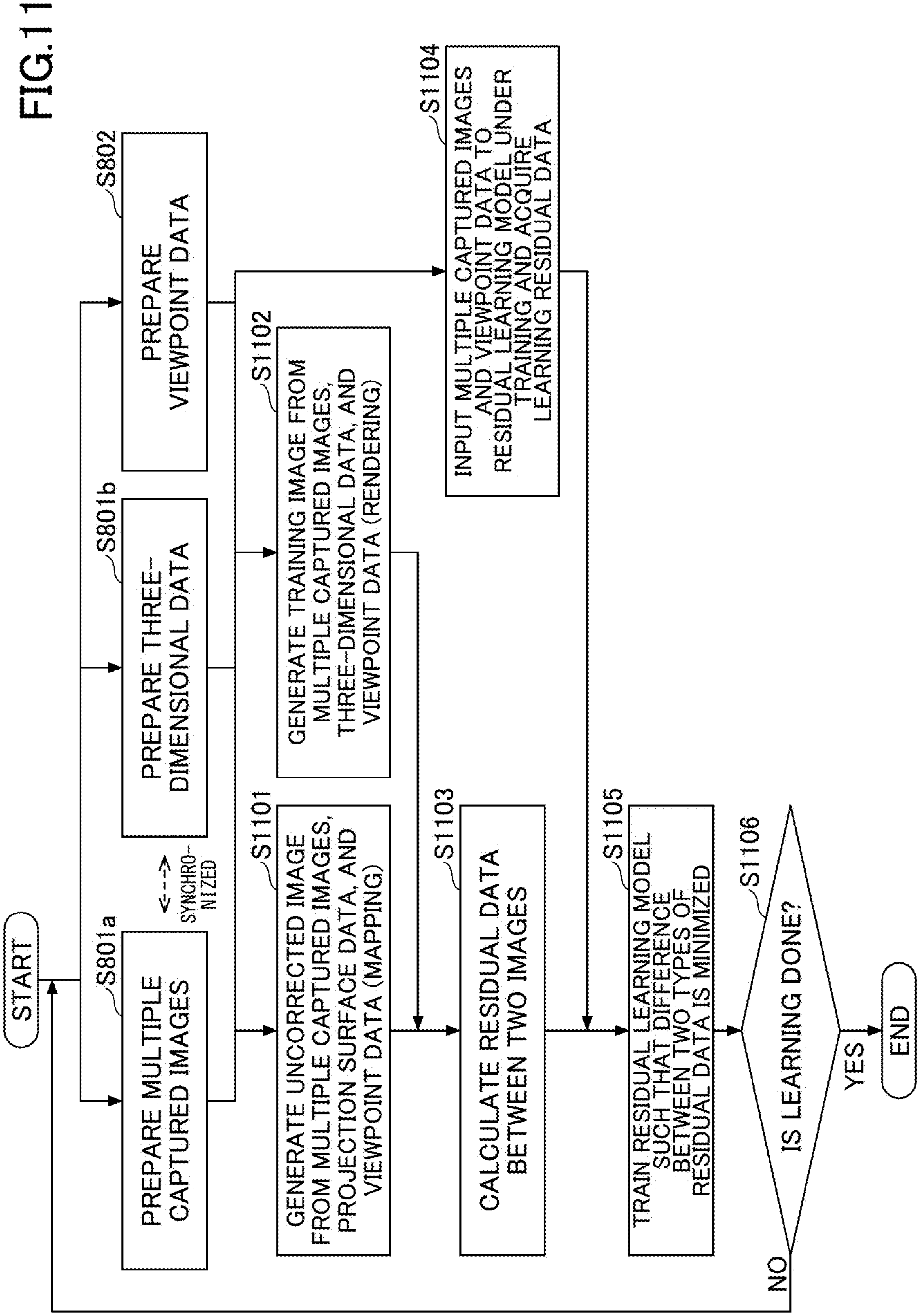
FIG. 11 is a flowchart that shows an example of learning according to the second embodiment of the present disclosure.

FIG. 11 is a flowchart illustrating an example learning process according to the second embodiment. This process illustrates a specific example of the learning process described earlier with reference to FIG. 9, executed by the image processing device 10 described with reference to FIG. 10. Note that, in the process illustrated in FIG. 11, steps S801*a*, S801*b* and S802 are the same as in the learning process of the first embodiment described with reference to FIG. 8, and therefore will not be described here.

In step S1101, using multiple images 210, projection surface data 230, and viewpoint data 240, the uncorrected image preparation part 1001, generates an uncorrected image 901 in which the images 210 are mapped onto the predefined projection surface 231.

In step S1102, the training image preparation part 703 recreates a three-dimensional image of the multiple images 210 based on the three-dimensional data prepared by the three-dimensional data preparation part 702, and generates a training image 602 based on the viewpoint data 240 (rendering).

In step S1103, the residual calculation part 1002 compares the uncorrected image 901 generated thus and the training image 602, and calculates residual data between the two images.

In step S1104, for example, in parallel with the process of step S1101 to step S1103, the learning part 704 inputs the multiple images 210 and the viewpoint data 240 into the residual learning model (NN) 710 and acquires the learning residual data 601.

In step S1105, the learning part 704 trains the residual learning model 710 such that the difference between two types of residual data, namely the difference between the two images calculated by the residual calculation part 1002 and the learning residual data, is minimized. For example, the learning part 704 determines the weight of the residual learning model 710 at which the difference between the two types of residual data is minimized, and sets the determined weight in the residual learning model 710.

In step S1106, the learning part 704 determines whether or not training is done. In the event training is not done, the learning part 704 brings the process back to step S801*a* and S801*b*. On the other hand, in the event training is done, the learning part 704 ends the process of FIG. 11.

The image processing device 10 that has been described above with reference to FIG. 4 can execute the image processing described with reference to FIG. 5 by using the NN (residual learning model 710) trained through the process of FIG. 11 as the residual estimation model 410.

(Residual Data Calculation Process)

Figure 12:
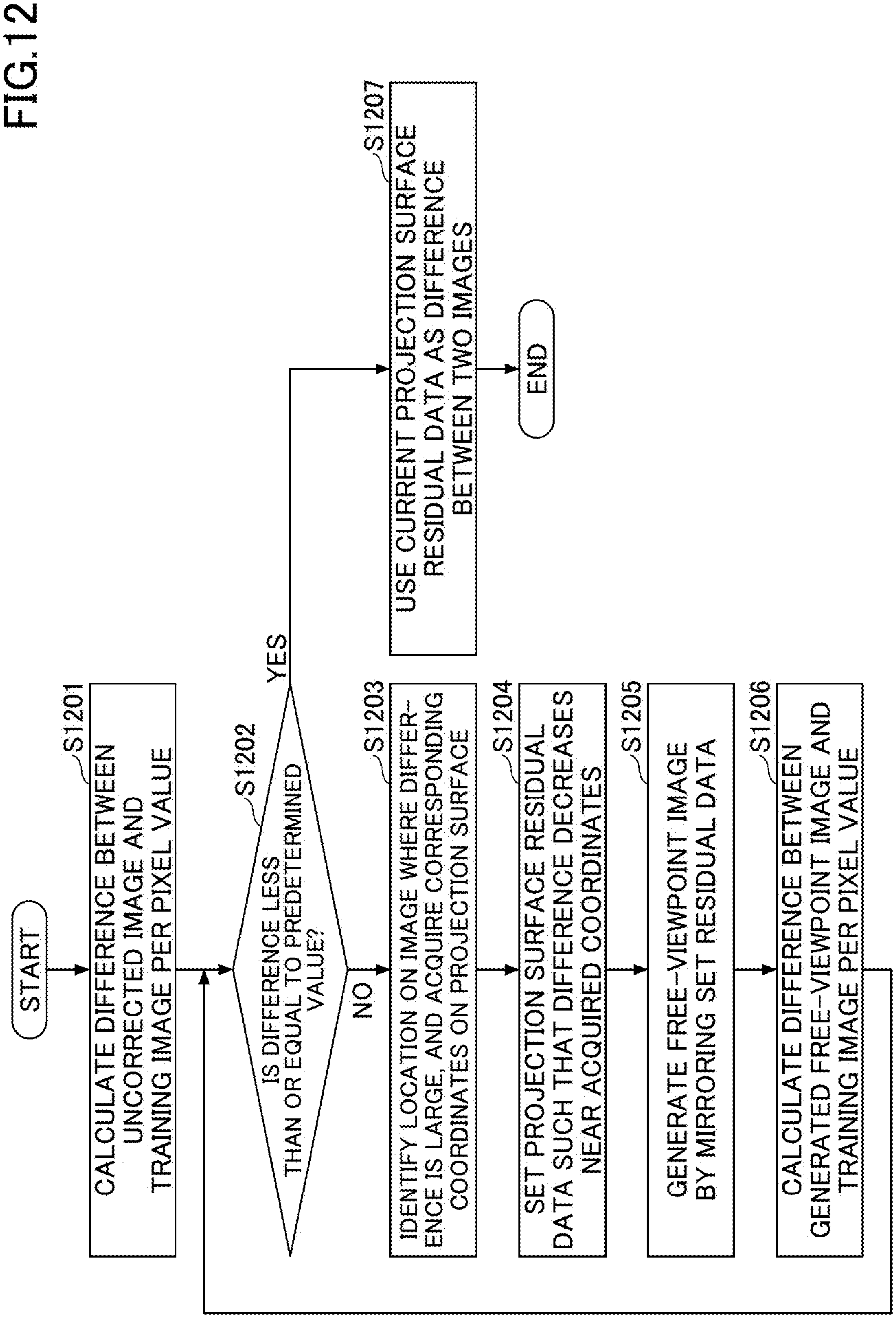
FIG. 12 is a flowchart that shows an example of calculation of residual data according to the second embodiment of the present disclosure.

FIG. 12 is a flowchart of the residual data calculation process according to the second embodiment. This process, for example, illustrates an example of the residual data calculation process performed by the residual calculation part 1002 in step S1103 of FIG. 11.

In step S1201, the residual calculation part 1002 calculates the difference between the uncorrected image 901 and the training image 602 on a per pixel basis (for example, calculates the difference between the two images per pixel value).

In step S1202, the residual calculation part 1002 determines whether each difference calculated is less than or equal to a predetermined value. If the difference is less than or equal to a predetermined value, the residual calculation part 1002 moves the process on to step S1207, and uses the current projection surface residual as residual data between the two images. On the other hand, if the difference is not less than or equal to a predetermined value, the residual calculation part 1002 moves the process on to step S1203.

Having moved to step S1203, the residual calculation part 1002 identifies a location where the difference is large on the image, and acquires the corresponding coordinates on the projection surface.

In step S1204, the residual calculation part 1002 sets projection surface residual data that makes the difference smaller around the coordinates acquired.

In step S1205, the residual calculation part 1002, mirroring the residual data thus set, generates a free viewpoint image.

In step S1206, the residual calculation part 1002 calculates the difference between the free viewpoint image generated thus and the training image, on a per pixel value basis, and the process returns to step S1202.

The residual calculation part 1002 repeats the process of FIG. 12 until the difference between the two images per pixel value is less than or equal to a predetermined value, thereby determining the residual data between the two images. However, the method in which the residual calculation part 1002 determines residual data between two images is by no means limited to the one described above.

Note that, in the learning process according to the first embodiment, the residual learning model 710 is trained (has its weight updated) using error back propagation (or "back propagation") from the point where an error occurs in an image. The prerequisite then is that each calculation in the learning scheme has to be differentiable.

On the other hand, in the learning process according to the second embodiment, the residual learning model 710 is trained using the residual data between the two images as is, so that there is an advantage that the residual calculation process need not be differentiable.

Depending on, for example, whether the applicant prefers the advantage of being able to use plain images as training images, or error back propagation, the applicant is able to make a choice between the learning process according to the first embodiment and the learning process according to the second embodiment.

Third Embodiment

The residual estimation model 410 and a preferable example structure of the residual learning model will be described with reference to a third embodiment.

Figure 13:
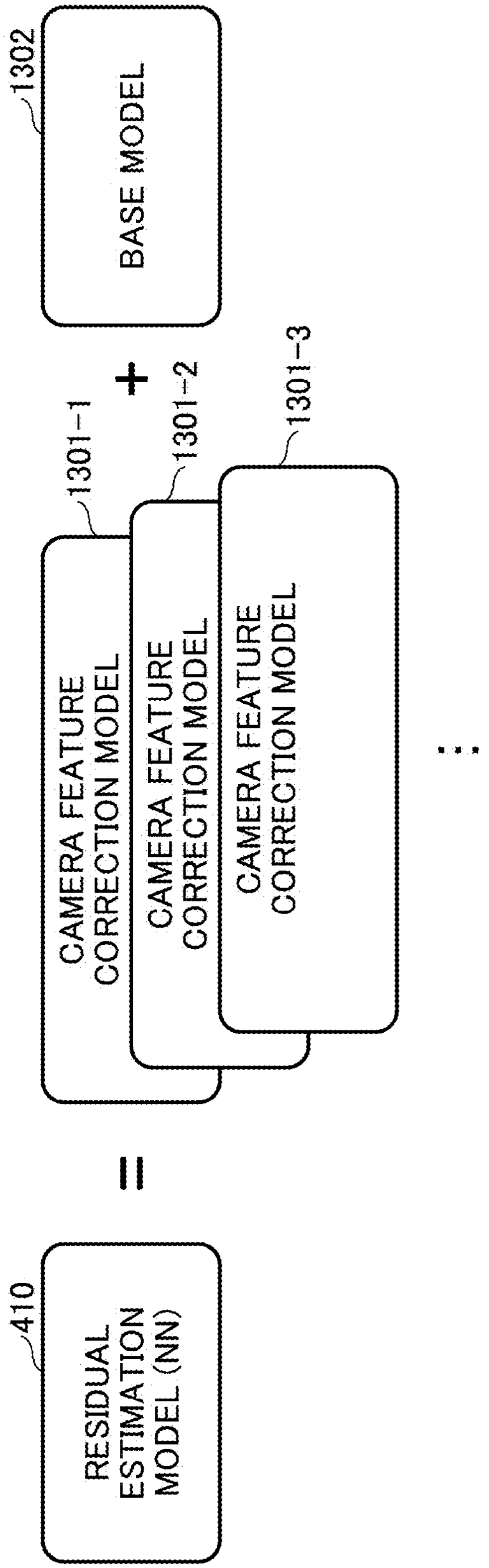
FIG. 13 is a diagram that shows an example structure of a residual estimation model according to a third embodiment of the present disclosure.

FIG. 13 is a diagram that shows an example structure of a residual estimation model according to a third embodiment of the present disclosure. The residual estimation model 410 may be structured such that multiple camera feature correction models 1301-1, 1301-2, 1301-3, . . . , and a base model 1302, which is shared in common by these camera feature correction models, are separate. Note that, in the following description, when referring to one or more of camera correction models among the camera feature correction models 1301-1, 1301-2, 1301-3, . . . , the phrase "camera feature correction model(s) 1301" will be simply used.

In this case, the image processing device 10 switches the camera feature correction model 1301, for example, depending on the settings arranged by the user. To be more specific, the user API (Application Programming Interface) has an argument for specifying the camera feature correction model 1301, and the user SDK has a database in which multiple camera feature correction models 1301 are defined and referenced in conjunction with the argument.

The camera feature correction model 1301 is a part of the network of the residual estimation model 410 that is mainly close to the image input part, and learns weight data that is sensitive to the camera parameters (such as focal distance). The camera feature correction model 1301 is an example of a camera model inference engine trained to infer feature map data of feature points of three-dimensional objects from multiple captured images for learning and three-dimensional data of one or more three-dimensional objects imaged in the multiple captured images for learning.

The base model 1302 learns weight data common to the camera feature correction models 1301 that is less affected by the camera parameters. The base model 1302 is an example of a base model inference engine trained to infer the difference between the predefined projection surface 231 and the display projection surface from the feature map data and viewpoint data 240 output by the camera feature correction model 1301.

Note that the residual estimation model 410 is an example of an inference engine structured such that multiple candidate camera model inference engines and a base model inference engine are separate. The weight data of the camera model inference engine after learning is more affected by multiple cameras' parameters than the weight data of the base model inference engine after training is done.

<Functional Structure>

Figure 14:
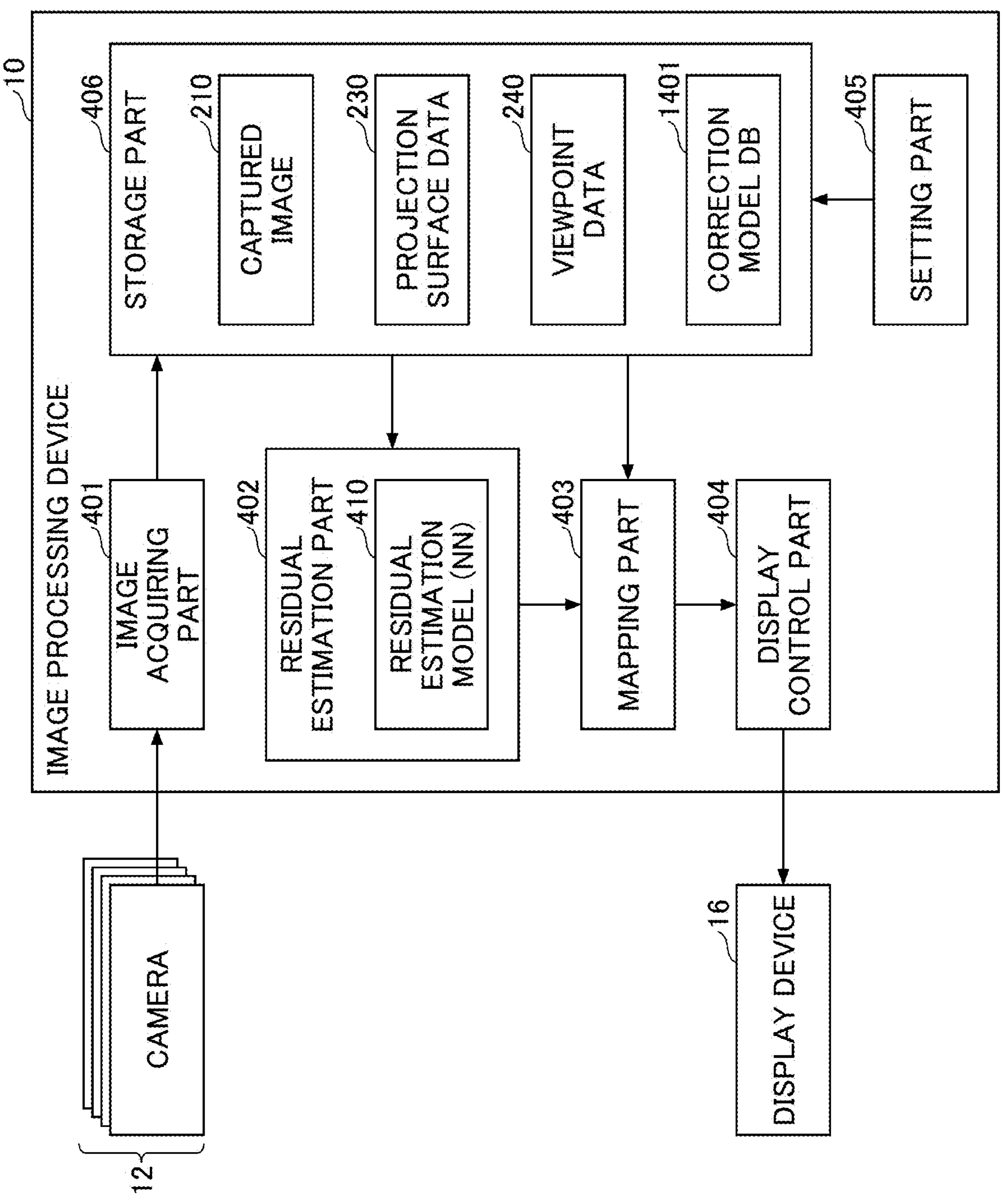
FIG. 14 is a diagram that shows an example functional structure of an image processing device according to the third embodiment of the present disclosure.

FIG. 14 is a diagram that shows an example functional structure of an image processing device according to the third embodiment. As shown in FIG. 14, the image processing device 10 according to the third embodiment has the functional structure of the image processing device 10 of one embodiment, which has been described earlier with reference to FIG. 4, and, in addition, this image processing device 10 stores a correction model DB (Database) 1401 in the storage part 406.

The correction model DB 1401 is a database in which multiple camera feature correction models 1301-1, 1301-2, 1301-3, . . . , are set forth.

For example, when the setting part 405 displays a setting screen for a set of cameras and confirms that the set of cameras have been set up by the user, the setting part 405 acquires a camera feature correction model 1301 that matches the set of cameras from the correction model DB 1401. Also, the setting part 405 sets the acquired camera feature correction model 1301 in the residual estimation model 410.

By this means, for example, when the user sets up a first set of cameras, the image processing device 10 carries out the image processing described earlier with reference to FIG. 5, using a residual estimation model 410 including the base model 1302 and the camera feature correction model 1301-1 that matches the first set of cameras. Likewise, for example, when the user sets up a second set of cameras, the image processing device 10 carries out the image processing described earlier with reference to FIG. 5, using a residual estimation model 410 including the base model 1302 and the camera feature correction model 1301-2 that matches the second set of cameras.

<Learning Process>

Following this, the learning process according to the third embodiment will be described below.

(Overview of Process)

Figure 15:
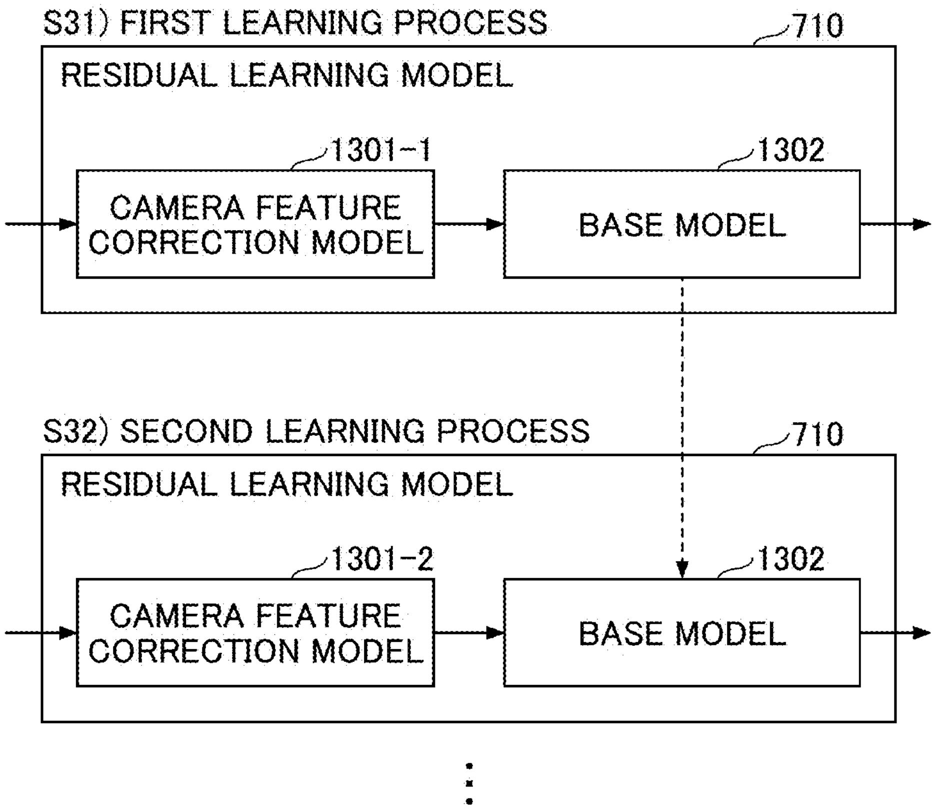
FIG. 15 is a diagram for explaining an overview of learning according to the third embodiment of the present disclosure.

FIG. 15 is a diagram for explaining an overview of the learning process according to the third embodiment. In the first learning process, the image processing device 10 learns the first camera feature correction model 1301-1 and the base model 1302 (step S31).

Also, in the second learning process, the image processing device 10 combines the second camera feature correction model 1301-2 with the base model 1302 learned through the first learning process, and learns the camera feature correction model 1302-2 (step S32).

Likewise, in the n-th learning process, the image processing device 10 can combine the n-th camera feature correction model 1301-*n* with the base model 1302 learned through the first learning process, and learn the camera feature correction model 1301-*n*.

(Learning Process 1)

Figure 16:
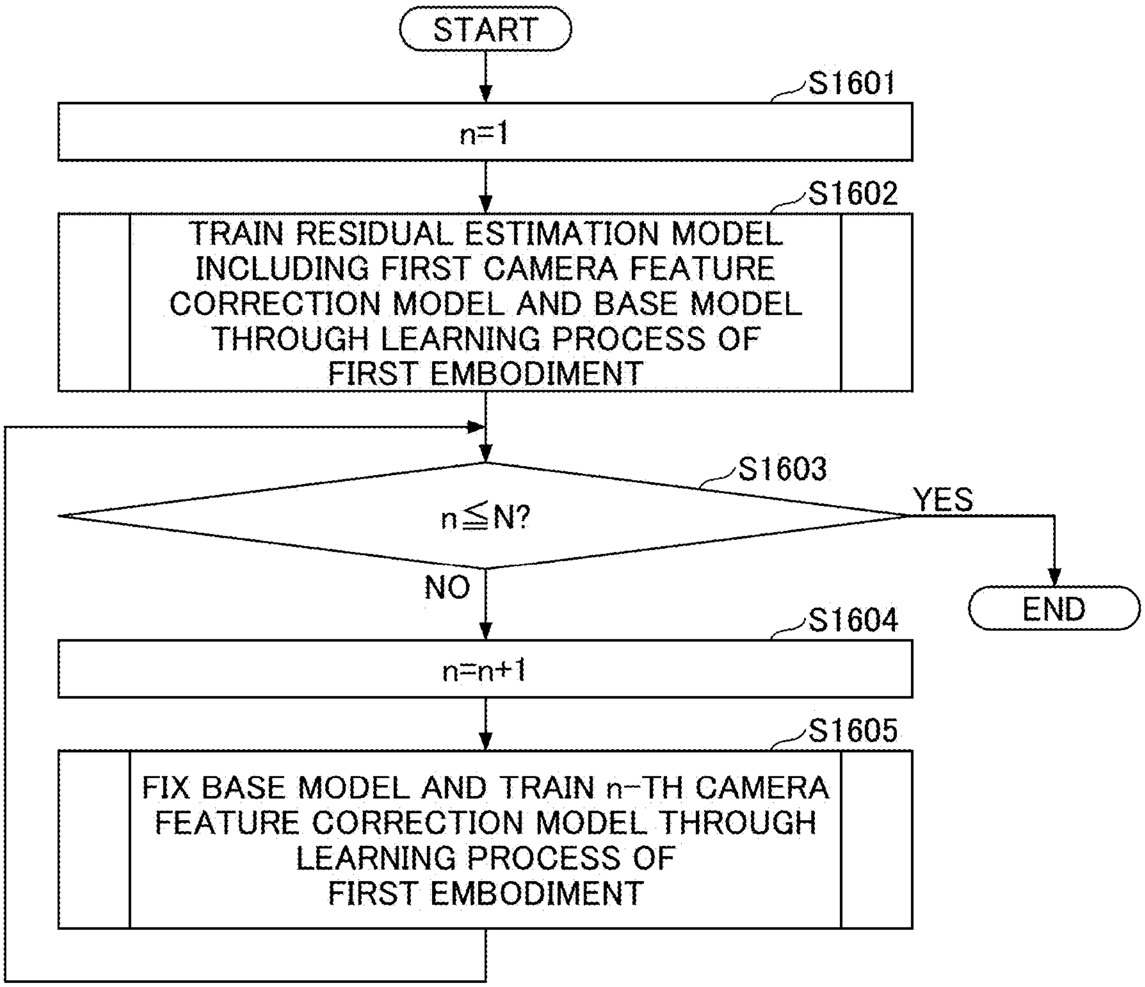
FIG. 16 is a flowchart (1) that shows an example of learning according to the third embodiment of the present disclosure.

FIG. 16 is a flowchart (1) illustrating an example learning process according to the third embodiment. This process illustrates a specific example of the learning process when the third embodiment is applied to the image processing device 10 according to the first embodiment having been described earlier with reference to FIG. 7. Note that the details of the process that are the same as in the first embodiment will not be described here.

In step S1601, the image processing device 10 initializes the counter n to 1, and carries out the process of step S1602.

In step S1602, the image processing device 10 learns a residual learning model 710, including the first camera feature correction model 1301-1 and the base model 1302, through the learning process according to the first embodiment having been described earlier herein with reference to FIG. 8.

For example, referring to the flowchart of FIG. 8, in step S801*a*, the captured image preparation part 701 carries out a first captured image preparation process of preparing first multiple captured images captured by each of the first multiple cameras 12 (first set of cameras).

In step S801*b*, the three-dimensional data preparation part 702 carries out a first three-dimensional data preparation process of preparing first three-dimensional data of one or more three-dimensional objects imaged in the first multiple captured images.

In step S803, the training image preparation part 703 carries out a first training image preparation process of recreating a three-dimensional image of the first multiple captured images based on the first three-dimensional data, and generating the first training image based on the viewpoint data received as an input.

In step S804, the learning part 704 inputs the first multiple captured images and parameters for at least one camera 12 among the first multiple cameras 12, into the first camera feature correction model 1301-1, and acquires first learning residual data.

In step S805, the learning part 704 generates a first learning image from the first learning residual data, the projection surface data 230, and the viewpoint data 240.

In step S806, the learning part 704 learns both the camera feature correction model 1301-1 and the base model 1302 such that the difference between the first training image and first learning image is minimized.

Now, referring back to FIG. 16, the process of and after step S1603 will be described. In step S1603, the image processing device 10 determines whether or not n≤N holds (where N is the number of camera feature correction models 1301). In the event n≤N does not hold, the image processing device 10 moves the process on to step S1604. On the other hand, in the event n≤N holds, the image processing device 10 ends the learning process of FIG. 16.

Having moved to step S1604, the image processing device 10 adds 1 to n, and carries out the process of step S1605.

In step S1605, the image processing device 10 fixes the base model 1302, and learns the n-th camera feature correction model, based on the learning process according to the first embodiment having been described earlier with reference to FIG. 8; the process returns to step S1603.

For example, in the event n=2 holds, in step S801*a*, the captured image preparation part 701 carries out a second captured image preparation process of preparing second multiple captured images using each of the second multiple cameras 12 (the second set of cameras) with reference to the flowchart of FIG. 8.

In step S801*b*, the three-dimensional data preparation part 702 carries out a second three-dimensional data preparation process of preparing second three-dimensional data of one or more three-dimensional objects imaged in the second multiple captured images.

In step S803, the training image preparation part 703 performs a second training image preparation process of recreating a three-dimensional image of the second multiple captured images based on the second three-dimensional data and generating a second training image based on the viewpoint data received as an input.

In step S804, the learning part 704 inputs the second multiple captured images and parameters for at least one camera 12 among the second multiple cameras 12, into the second camera feature correction model 1301-2, and acquires second learning residual data.

In step S805, using the second learning residual data, the projection surface data 230, and the viewpoint data 240, the learning part 704 generates a second learning image by mapping the second multiple captured images onto the display projection surface.

In step S806, the learning part 704 fixes the base model 1302, and learns the camera feature correction model 1301-2 such that the difference between the second training image and the second learning image becomes smaller.

Through the learning process shown in FIG. 16, the image processing device 10 can obtain the residual estimation model 410 including, as shown in FIG. 13, multiple camera feature correction models 1301-1, 1301-2, 1302-3, . . . , and the base model 1302.

(Learning Process 2)

Figure 17:
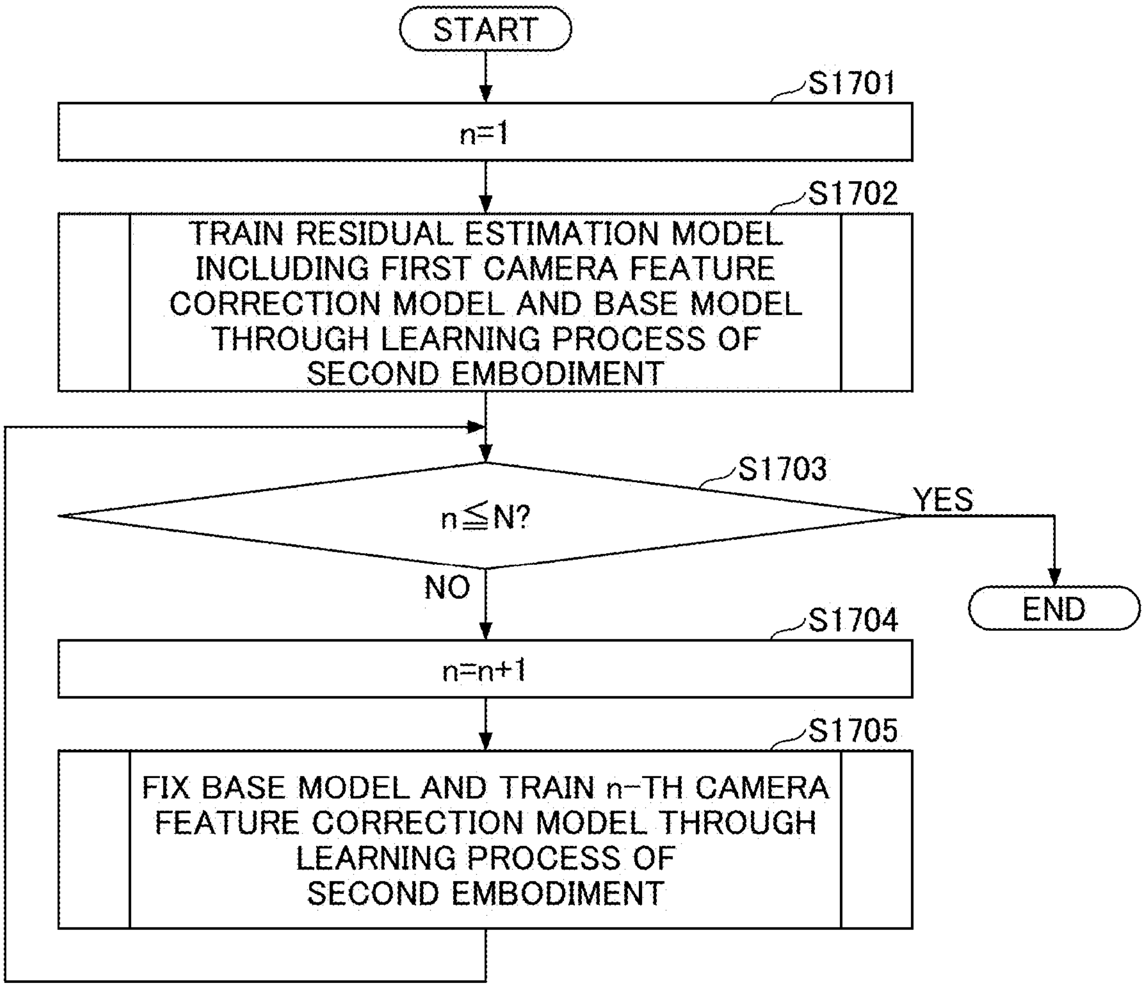
FIG. 17 is a flowchart (2) that shows an example of learning according to the third embodiment of the present disclosure.

FIG. 17 is a flowchart (2) illustrating an example learning process according to the third embodiment. This process illustrates a specific example of the learning process when the third embodiment is applied to the image processing device 10 according to the second embodiment having been described earlier with reference to FIG. 10. Note that the details of the process that are the same as in the second embodiment will not be described here.

In step S1701, the image processing device 10 initializes the counter n to 1, and carries out the process of step S1702.

In step S1702, the image processing device 10 learns a residual learning model 710, including the first camera feature correction model 1301-1 and the base model 1302, through the learning process according to the second embodiment having been described earlier herein with reference to FIG. 11.

For example, referring to the flowchart of FIG. 11, in step S801*a*, the captured image preparation part 701 carries out a first captured image preparation process of preparing first multiple captured images captured by each of the first multiple cameras 12 (first set of cameras).

In step S801*b*, the three-dimensional data preparation part 702 carries out a first three-dimensional data preparation process of preparing first three-dimensional data of one or more three-dimensional objects imaged in the first multiple captured images.

In step S1101, the uncorrected image preparation part 1101 carries out a first uncorrected image preparation process of mapping the first multiple captured images onto a predefined projection surface and generating a first uncorrected image based on the viewpoint data received as an input.

In step S1102, the training image preparation part 703 carries out a first training image preparation process of recreating a three-dimensional image of the first multiple captured images based on the first three-dimensional data, and generating the first training image based on the viewpoint data 240 received as an input.

In step S1103, the residual calculation part 1002 carries out a first residual calculation process of comparing the first uncorrected image and the first training image and preparing the first residual data.

In step S1104, the learning part 704 inputs the first multiple captured images and the viewpoint data 240 into the residual learning model 710 under training, and acquires the first learning residual data. To be more specific, the learning part 704 inputs the first multiple captured images and parameters for at least one of the first set of cameras into the first camera feature correction model 1301-1, and acquires first feature map data. Also, the learning part 704 inputs the acquired first feature map data and viewpoint data 240 into the base model 1302, and acquires first learning residual data.

In step S1105, the learning part 704 learns the residual learning model 710 such that the difference between two types of residual data, that is, the difference between the first residual data and the first learning residual data calculated by the residual calculation part 1002, is minimized. In this way, the learning part 704, using the first residual data as training data, learns both the first camera feature correction model 1301-1 and the base model 1302 at the same time.

Referring back to FIG. 17, the process of and after step S1703 will be described below. In step S1703, the image processing device 10 determines whether or not n≤N holds (where N is the number of camera feature correction models 1301). In the event n≤N does not hold, the image processing device 10 moves the process on to step S1704. On the other hand, in the event n≤N holds, the image processing device 10 ends the learning process of FIG. 17.

Having moved to step S1704, the image processing device 10 adds 1 to n and carries out the process of step S1705.

In step S1705, the image processing device 10 fixes the base model 1302, and learns the n-th camera feature correction model through the learning process according to the second embodiment having been described with reference to FIG. 11; the process returns to step S1703.

For example, in the event n=2 holds, in step S801*a*, the captured image preparation part 701 carries out a second captured image preparation process of preparing second multiple captured images using each of the second multiple cameras 12 (the second set of cameras) with reference to the flowchart of FIG. 11.

In step S801*b*, the three-dimensional data preparation part 702 carries out a second three-dimensional data preparation process of preparing second three-dimensional data of one or more three-dimensional objects imaged in the second multiple captured images.

In step S1101, the uncorrected image preparation part 1101 carries out a second uncorrected image preparation process of mapping the second multiple captured images onto the predefined projection surface 231, and generating a second uncorrected image based on the viewpoint data 240 received as an input.

In step S1102, the training image preparation part 703 carries out a second training image preparation process of recreating a three-dimensional image of the second multiple captured images based on the second three-dimensional data and generating a second training image based on the viewpoint data 240 received as an input.

In step S1103, the residual calculation part 1002 carries out a second residual calculation process of comparing the second uncorrected image and the second training image and preparing the second residual data.

In step S1104, the learning part 704 inputs the second multiple captured images and the viewpoint data 240 into the residual learning model 710 under training, and acquires second learning residual data. To be more specific, the learning part 704 inputs the second multiple captured images and parameters for at least one of the second set of cameras into the second camera feature correction model 1301-2, and acquires second feature map data. Also, the learning part 704 inputs the acquired second feature map data and viewpoint data 240 into the base model 1302, and acquires second learning residual data.

In step S1105, the learning part 704 fixes the base model 1302, and learns the second camera feature correction model 1301-2 such that the difference between two types of residual data, that is, the difference between the second residual data and the second learning residual data calculated by the residual calculation part 1002 is minimized. By this means, using the second residual data as training data, the learning part 704 learns the second camera feature correction model 1301-2.

Through the learning process shown in FIG. 17, the image processing device 10 can obtain the residual estimation model 410 including, as shown in FIG. 13, multiple camera feature correction models 1301-1, 1301-2, 1302-3, . . . , and the base model 1302.

Fourth Embodiment

Cases have been described with the above embodiments in which the image processing system 100 is mounted in a vehicle 1 such as an automobile or the like. Now, with a fourth embodiment of the present disclosure, an example case will be described in which the image processing system 100 is applied to a three-dimensional image display system for displaying three-dimensional images on an edge device such as AR goggles and the like.

Figure 18:
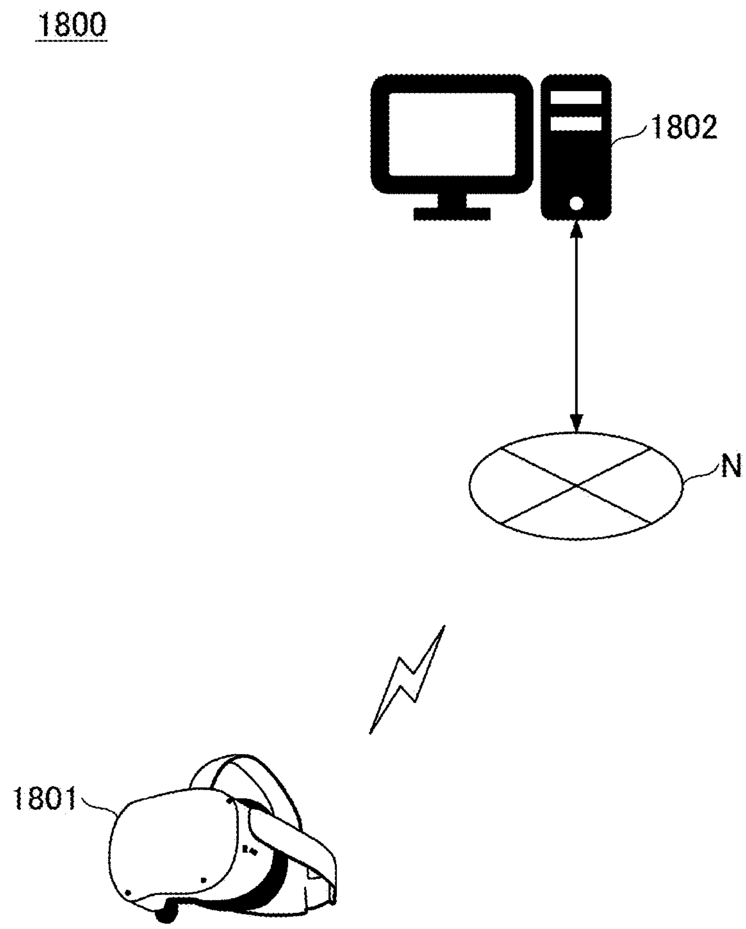
FIG. 18 is a diagram that shows an example system structure of a three-dimensional image display system according to a fourth embodiment of the present disclosure.

FIG. 18 is a diagram that shows an example system structure of a three-dimensional image display system according to the fourth embodiment of the present disclosure. The three-dimensional image display system 1800 includes: an edge device 1801 such as AR goggles or the like; and server 1802 that can communicate with the edge device 1801 via, for example, a communication network N such as the Internet, LAN (Local Area Network), etc.

The edge device 1801 has, for example, one or more nearby cameras, a three-dimensional sensor, a display device, a communication I/F and the like. The edge device 1801 transmits images captured by nearby cameras, three-dimensional data acquired by the three-dimensional sensor, and so forth, to the server 1802.

The server 1802 has one or more computers 300. By running predetermined programs and using the captured images received from the edge device 1801 and three-dimensional data, the server 1802 generates a three-dimensional image, and transmits this three-dimensional image to the edge device 1801. Note that the server 1802 is an example of a remote processing part.

The edge device 1801 displays the three-dimensional image received from the server 1802 on a display device, thereby displaying a three-dimensional image of the surroundings.

However, systems heretofore have the following problem: after the edge device 1801 transmits captured images and three-dimensional data to the server 1802, no display of three dimensional images is possible until three-dimensional images are received from the server 1802.

According to the present embodiment, after the edge device 1801 transmits captured images and three-dimensional data to the server 1802, for example, a free viewpoint image generated based on the image processing described earlier herein with reference to FIG. 5 is displayed until a three-dimensional image arrives from the server 1802. By this means, the three-dimensional image display system 1800 according to the present embodiment can display a virtual space even before the edge device 1801 receives a three-dimensional image from the server 1802.

<Hardware Structure>

Figure 19:
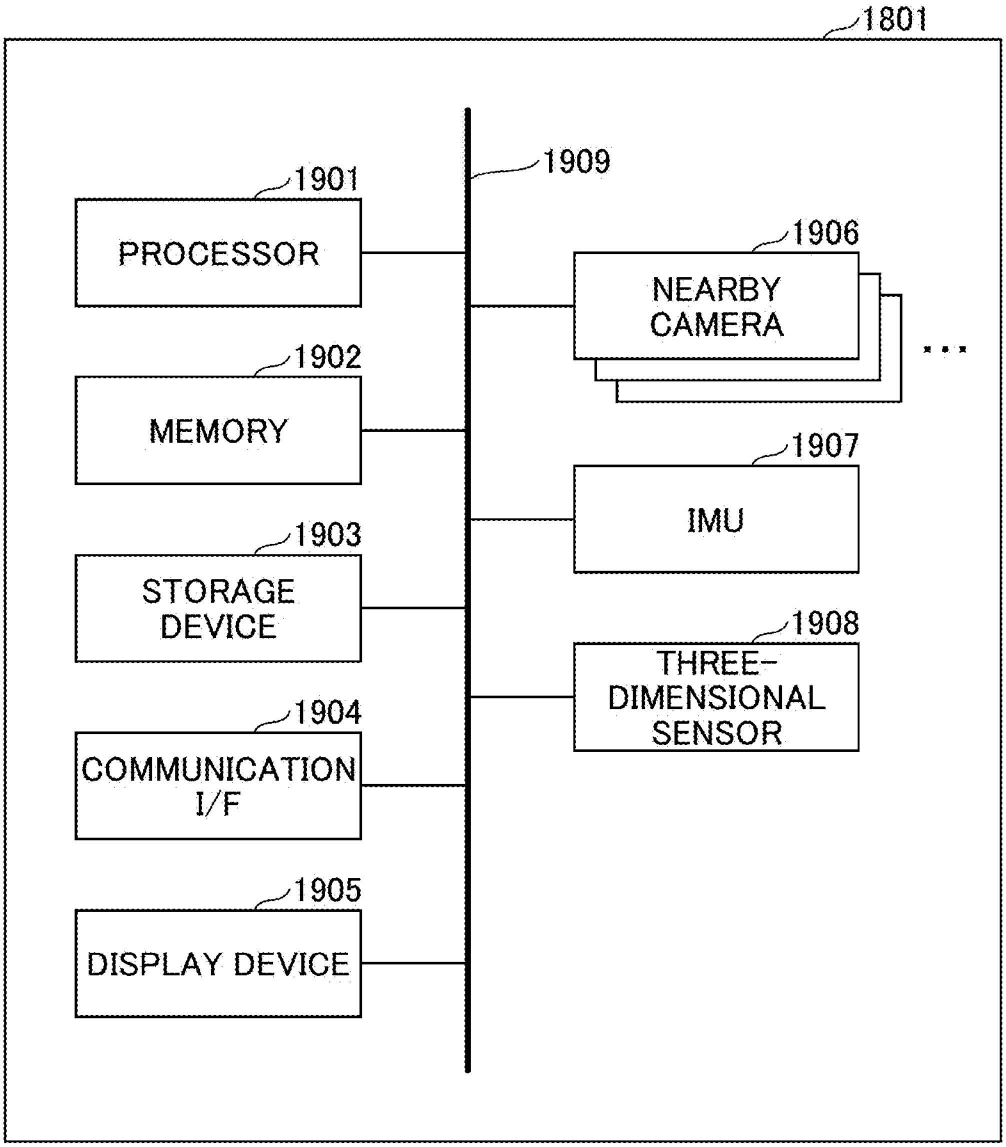
FIG. 19 is a diagram that shows an example hardware structure of an edge device according to the fourth embodiment of the present disclosure.

FIG. 19 is a diagram that shows an example hardware structure of an edge device according to the fourth embodiment of the present disclosure. The edge device 1801 has a computer's structure, and includes, for example, a processor 1901, a memory 1902, a storage device 1903, a communication I/F 1904, a display device 1905, multiple nearby cameras 1906, an IMU 1907, a three-dimensional sensor 1908, a bus 1909, and so on.

The processor 1901 is a calculation device like a CPU, a GPU and so forth, that executes predetermined processes by running programs stored in a storage medium such as storage device 1903. The memory 1902 includes, for example: a RAM, which is a volatile memory used as a work area for the processor 1901; and a ROM, which is a non-volatile memory that stores programs for starting up the processor 1901, and so on. The storage device 1903 is, for example, a large-capacity non-volatile storage device such as an SSD or HDD.

The communication I/F 1904 is a communication device such as a WAN (Wide Area Network) or a LAN (Local Area Network) that connects the edge device 1801 to the communication network N and communicates with the server 1802. The display device 1905 is, for example, a display part such as an LCD or an organic EL. The multiple nearby cameras 1906 are cameras that capture images around the edge device 1801.

The IMU (Inertial Measurement Unit) 1907 is a device for measuring inertia that, for example, detects three-dimensional angular velocity and acceleration by using a gyro sensor and an acceleration sensor. The three-dimensional sensor 1908 is a sensor that acquires three-dimensional data, and includes, for example, a LiDAR, a stereo cameras, a depth camera, a wireless sensing device, etc. The bus 1909 is connected to each of the above components and transmits, for example, address signals, data signals, various control signals, etc.

<Functional Structure>

Figure 20:
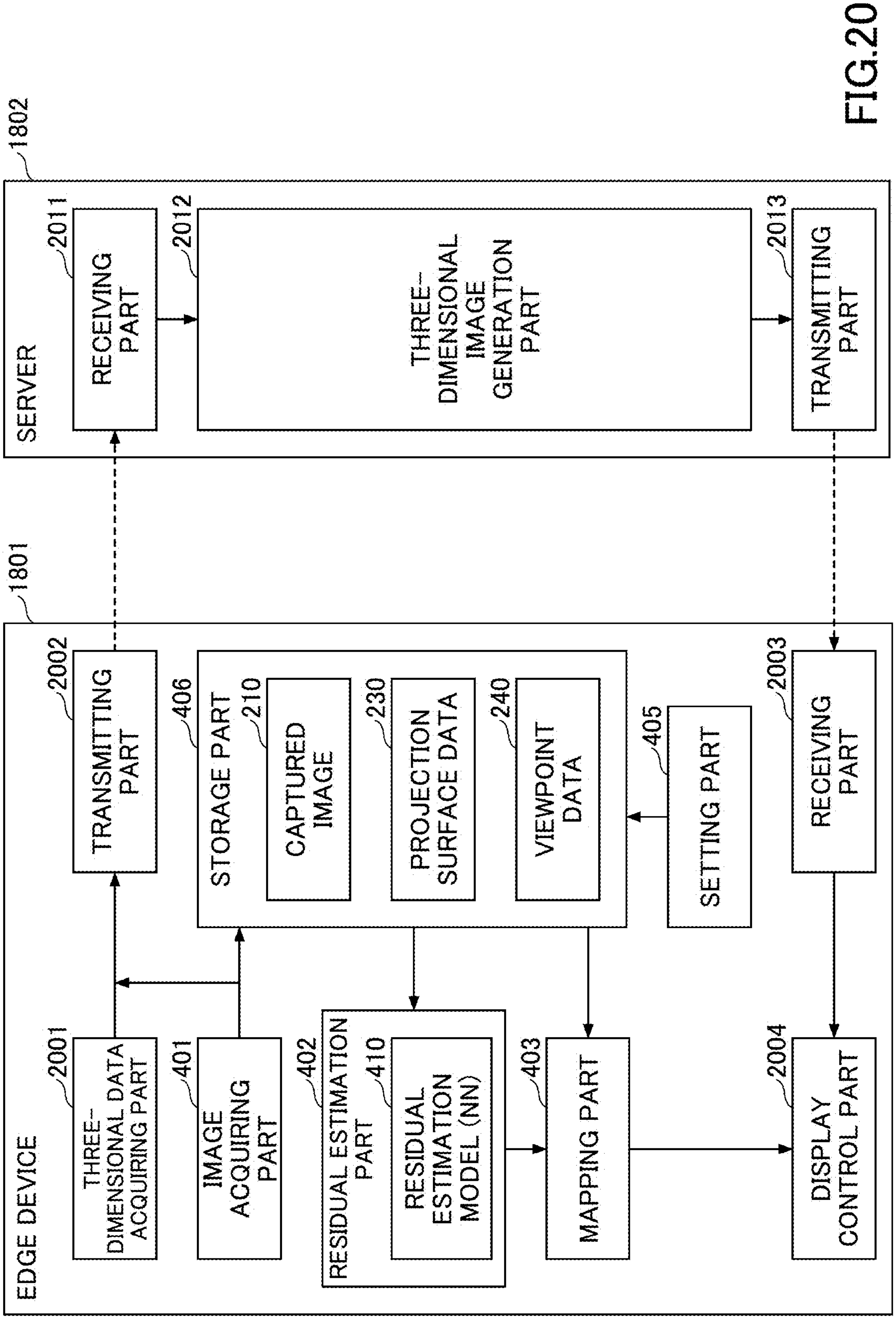
FIG. 20 is a diagram that shows an example functional structure of a three-dimensional image display system according to the fourth embodiment of the present disclosure.

FIG. 20 is a diagram that shows a functional structure of a three-dimensional image display system according to the fourth embodiment of the present disclosure.

(Functional Structure of Edge Device)

The edge device 1801 has the functional structure of the image processing device 10 that has been described above with reference to FIG. 4, and, in addition, by running predetermined programs on the processor 1901, has a three-dimensional data acquiring part 2001, a transmitting part 2002, a receiving part 2003, etc. Also, the edge device 1801 has a display control part 2004 instead of the display control part 404. Note that the image acquiring part 401, the residual estimation part 402, the mapping part 403, the setting part 405, and the storage part 406 are the same functional parts as those of the image processing device 10 that has been described above with reference to FIG. 4, and therefore will not be described here.

The three-dimensional data acquiring part 2001 acquires three-dimensional data from around the edge device 1801 by using the three-dimensional sensor 1908. The transmitting part 2002 transmits the three-dimensional data acquired by the three-dimensional data acquiring part 2001 and multiple images acquired by the image acquiring part 401, to the server 1802.

For example, the receiving part 2003 receives a three-dimensional image that is transmitted from the server 1802 in response to the three-dimensional data and multiple images from the transmitting part 2002. Before the receiving part 2003 finishes receiving the three-dimensional image, the display control part 2004 displays a free viewpoint image 250, which is generated in the mapping part 403, on the display device 16 or the like. After the receiving part 2003 finishes receiving the three-dimensional image, the display control part 2004 displays the received three-dimensional image on the display device 16 or the like.

(Functional Structure of Server)

The server 1802 implements the receiving part 2011, three-dimensional image generation part 2012, transmitting part 2013, etc., by running predetermined programs on one or more computers 300.

The receiving part 2011, for example, using the communication device 307, receives the three-dimensional data and multiple images transmitted from the edge device 1801.

Using the three-dimensional data and multiple images received by the receiving part 2011, the three-dimensional image generation part 2012 renders the images in a three-dimensional space and generates a three-dimensional image of the surroundings of the edge device 1801. Note that, as for the method of generating three-dimensional images in the server 1802, the present embodiment may use any method.

The transmitting part 2013 transmits the three-dimensional images generated by the three-dimensional image generation part 2012, to the edge device, by using, for example, the communication device 307.

<Process Flow>

Figure 21:
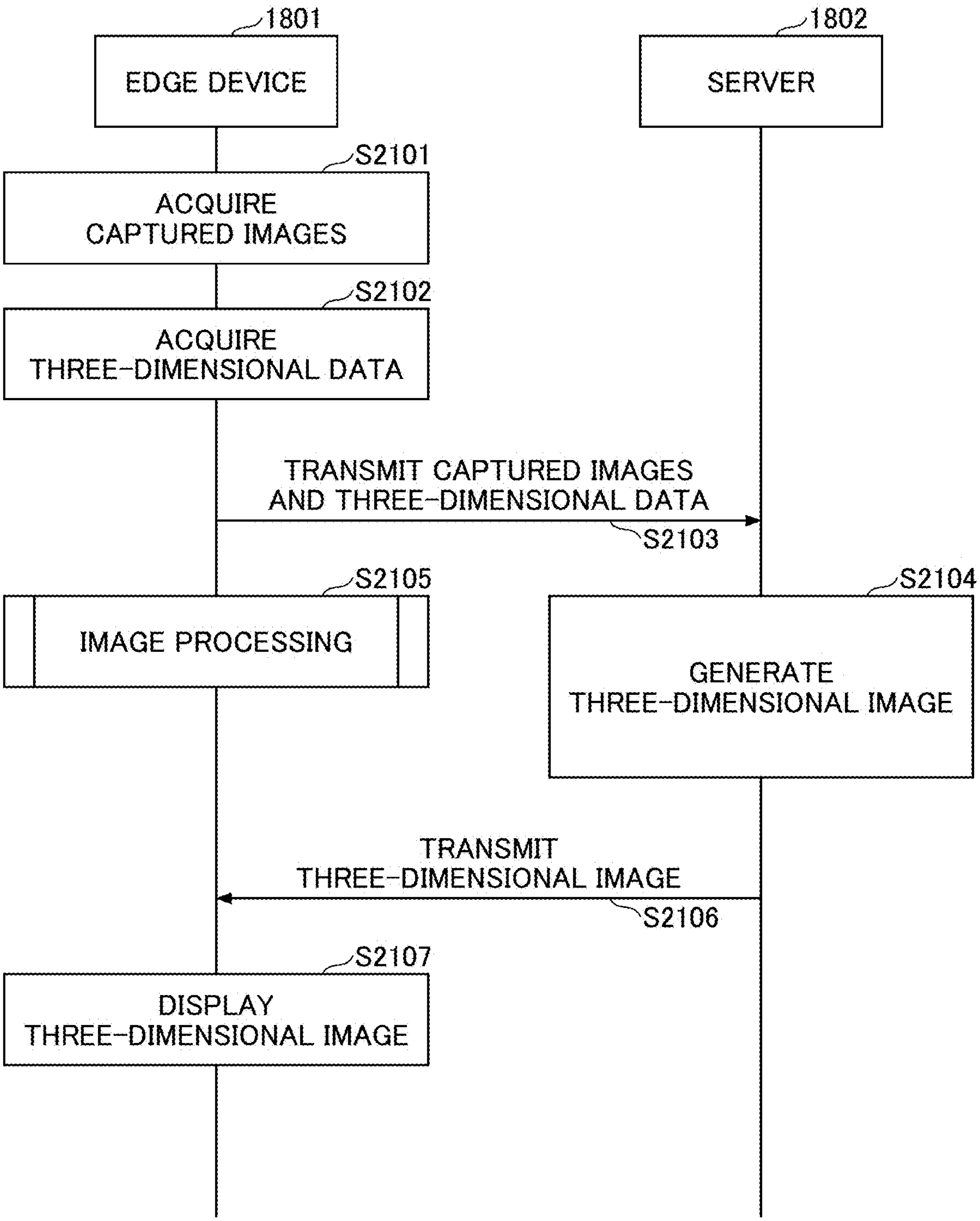
FIG. 21 is a sequence diagram that shows an example of a three-dimensional image display process according to the fourth embodiment of the present disclosure.

FIG. 21 is a sequence diagram that shows an example of the three-dimensional image display process according to the fourth embodiment of the present disclosure.

In step S2101, the image acquiring part 401 of the edge device 1801 acquires multiple images, which are images of the surroundings of the edge device 1801 captured by each of the nearby cameras 1906.

In step S2102, using the three-dimensional sensor 1908, a three-dimensional data acquiring part 2001 of the edge device 1801 acquires three-dimensional data of one or more three-dimensional objects imaged in the multiple images. For example, the three-dimensional data acquiring part 2001 acquires three-dimensional point-cloud data or the like from the surroundings of the edge device 1801.

In step S2103, the transmitting part 2002 of the edge device 1801 transmits the images acquired by the image acquiring part 401 and the three-dimensional data acquired by the three-dimensional data acquiring part 2001, to the server 1802.

In step S2104, the three-dimensional image generation part 2012 of the server 1802, using the multiple images and three-dimensional data received from the edge device 1801, carries out a three-dimensional image generation process of generating a three-dimensional image, in which the images received from the edge device 1801 are rendered in a three-dimensional space. However, this process takes time; the time required for the process might vary depending on the condition of communication with the edge server, the load on the server 1802, and so forth.

In step S2105, the edge device 1801 carries out, for example, the image processing described earlier with reference to FIG. 5, in parallel with the process of step S2104, thereby generating a free viewpoint image, in which multiple images are mapped on a display projection surface, and displaying the free viewpoint image on the display device 1905. Note that this process can be performed in a shorter time than the three-dimensional image generation process performed by the server 1802. Also, this process is unaffected by information communicated with the server 1802, the load on the server 1802 and like factors, so that images of the surroundings of the edge device 1801 can be displayed in a shorter time.

In step S2106, when the three-dimensional image generation part 2012 of the server 1802 finishes generating the three-dimensional images, the transmitting part 2013 of the server 1802 transmits the generated three-dimensional image to the edge device 1801.

In step S2107, when the three-dimensional image arrives from the server 1802, the display control part 2004 of the edge device 1801 displays the received three-dimensional image on the display device 1905.

By means of the process of FIG. 21 after the three-dimensional image display system 1800 transmits multiple images and three-dimensional data to the server 1802, a virtual space can be displayed before a three-dimensional image arrives from the server 1802.

According to the embodiments of the present disclosure described hereinabove, it is possible to synthesize free viewpoint images with little distortion, without relying on a three-dimensional sensing device, in an image processing system in which free viewpoint images are synthesized using multiple images.

What is claimed is:

1. A computer-implemented image processing method of synthesizing a free viewpoint image on a display projection surface from a plurality of captured images, the method comprising:

acquiring the plurality of captured images with a plurality of respective cameras;

estimating projection surface residual data by machine learning using the plurality of captured images and viewpoint data as inputs, the projection surface residual data representing a difference between a bowl-shaped predefined projection surface and the display projection surface; and acquiring the free viewpoint image by mapping the plurality of captured images onto the display projection surface using information about the predefined projection surface, the projection surface residual data, and the viewpoint data.

2. The image processing method according to claim 1, wherein the projection surface residual data is estimated using an inference engine trained to infer the difference between the predefined projection surface and the display projection surface from a plurality of captured images for learning, the viewpoint data, and three-dimensional data of one or more three-dimensional objects imaged in the plurality of captured images for learning.

3. The image processing method according to claim 1, wherein the projection surface residual data is estimated using:

a camera model inference engine trained to infer feature map data of feature points of one or more three-dimensional objects imaged in a plurality of captured images for learning, from the plurality of captured images for learning, and three-dimensional data of the one or more three-dimensional objects; and a base model inference engine trained to infer the difference between the predefined projection surface and the display projection surface from the viewpoint data and the feature map data output from the camera model inference engine.

4. The image processing method according to claim 3, wherein parameters for the cameras have a greater effect on weight data of the camera model inference engine after learning than on weight data of the base model inference engine after learning.

5. The image processing method according to claim 3, a parameter for at least one of the plurality of cameras is input into the camera model inference engine.

6. The image processing method according to claim 3, the camera model inference engine for inferring feature map data is selected from a plurality of candidate camera model inference engines, each trained on a different parameter.

7. A computer-implemented method of training a neural network which infers residual data based on a plurality of captured images, the residual data representing a difference between a bowl-shaped predefined projection surface and a projection surface reflecting three-dimensional data of one or more three-dimensional objects imaged in the plurality of captured images, the method comprising:

preparing the plurality of captured images taken by a plurality of respective cameras;

preparing the three-dimensional data;

recreating a three-dimensional image from the plurality of captured images based on the three-dimensional data to generate a training image that serves as a free viewpoint image for training based on viewpoint data given as an input; and inputting the plurality of captured images and the viewpoint data into a neural network to produce learning residual data, generating a learning image that serves as a free viewpoint image for learning by mapping the plurality of captured images onto a display projection surface using the learning residual data, information about the predefined projection surface, and the viewpoint data, and training the neural network such that a difference between the training image and the learning image becomes smaller.

8. The neural network training method according to claim 7, wherein the neural network includes:

a camera model inference network in which the plurality of captured images and a parameter for at least one of the plurality of cameras are input; and a base model inference network in which an output of the camera model inference network and the viewpoint data are input.

9. A computer-implemented method of training a neural network which infers residual data based on a plurality of captured images, the residual data representing a difference between a bowl-shaped predefined projection surface and a projection surface reflecting three-dimensional data of one or more three-dimensional objects imaged in the plurality of captured images, the method comprising:

preparing the plurality of captured images taken by a plurality of respective cameras;

mapping the plurality of captured images onto the predefined projection surface to generate an uncorrected image that serves as an uncorrected free viewpoint image based on viewpoint data received as an input;

preparing the three-dimensional data;

recreating a three-dimensional image from the plurality of captured images based on the three-dimensional data to generate a training image that serves as a training free viewpoint image based on the viewpoint data;

comparing the uncorrected free viewpoint image and the training image to prepare the residual data; and inputting the plurality of captured images and the viewpoint data into the neural network to train the neural network using the residual data prepared as training data.

10. A computer-implemented three-dimensional image display method of synthesizing a free viewpoint image from a plurality of captured images and displaying the free viewpoint image on a display projection surface, the method comprising:

acquiring the plurality of captured images with a plurality of respective cameras;

acquiring three-dimensional data of one or more three-dimensional objects imaged in the plurality of captured images;

estimating projection surface residual data by machine learning using the plurality of captured images and viewpoint data as inputs, the projection surface residual data representing a difference between a bowl-shaped predefined projection surface and the display projection surface;

acquiring the free viewpoint image by mapping the plurality of captured images onto the display projection surface using information about the predefined projection surface, the projection surface residual data, and the viewpoint data;

transmitting the plurality of captured images and the three-dimensional data to a remote processing part;

receiving, from the remote processing part, a three-dimensional image recreated at the remote processing part from the plurality of captured images based on the three-dimensional data; and displaying the free viewpoint image on a display part before receiving the three-dimensional image, and displaying the three-dimensional image on the display part after receiving the three-dimensional image.

11. An image processing system for synthesizing a free viewpoint image on a display projection surface from a plurality of captured images, the system comprising:

a processor; and a memory coupled to the processor and storing instructions that, when executed, cause the processor to:

acquire the plurality of captured images with a plurality of respective cameras;

estimate projection surface residual data by machine learning using the plurality of captured images and viewpoint data as inputs, the projection surface residual data representing a difference between a bowl-shaped predefined projection surface and the display projection surface; and acquire the free viewpoint image by mapping the plurality of captured images onto the display projection surface using information about the predefined projection surface, the projection surface residual data, and the viewpoint data.

12. A system for training a neural network which infers residual data of a projection surface based on a plurality of captured images, the residual data representing a difference between a bowl-shaped predefined projection surface and a projection surface reflecting three-dimensional data of one or more three-dimensional objects imaged in the plurality of captured images, the system comprising:

a processor; and a memory coupled to the processor and storing instructions that, when executed, cause the processor to:

prepare the plurality of captured images taken by a plurality of respective cameras;

prepare the three-dimensional data; and recreate a three-dimensional image from the plurality of captured images based on the three-dimensional data to generate a training image that serves as a free viewpoint image for training based on viewpoint data given as an input; and input the plurality of captured images and the viewpoint data in a neural network to produce learning residual data, generate a learning image that serves as a free viewpoint image for learning by mapping the plurality of captured images onto a display projection surface using the learning residual data, information about the predefined projection surface, and the viewpoint data, and train the neural network such that a difference between the training image and the learning image becomes smaller.

* * * * *